US010432010B2

(12) United States Patent
Nemoto et al.

(10) Patent No.: US 10,432,010 B2
(45) Date of Patent: Oct. 1, 2019

(54) ELECTRONIC APPARATUS, POWER SUPPLY DEVICE, AND WIRELESS POWER SUPPLY SYSTEM

(71) Applicant: FUJI XEROX CO., LTD., Tokyo (JP)

(72) Inventors: Yoshihiko Nemoto, Kanagawa (JP); Masahiro Sato, Kanagawa (JP); Tsutomu Kimura, Kanagawa (JP); Akihito Yamauchi, Kanagawa (JP); Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 128 days.

(21) Appl. No.: 15/602,947

(22) Filed: May 23, 2017

(65) Prior Publication Data

US 2018/0109131 A1 Apr. 19, 2018

(30) Foreign Application Priority Data

Oct. 13, 2016 (JP) ................................ 2016-201814

(51) Int. Cl.

| | |
|---|---|
| ***H02J 7/00*** | (2006.01) |
| ***H02J 7/02*** | (2016.01) |
| ***H02J 50/12*** | (2016.01) |
| ***H02J 50/20*** | (2016.01) |
| ***H02J 50/00*** | (2016.01) |
| *B65D 1/00* | (2006.01) |
| *H02J 50/10* | (2016.01) |

(52) U.S. Cl.

CPC .............. *H02J 7/025* (2013.01); *H02J 50/00* (2016.02); *H02J 50/12* (2016.02); *H02J 50/20* (2016.02); *B65D 1/00* (2013.01); *H02J 50/10* (2016.02)

(58) Field of Classification Search

USPC ......................... 320/106, 107, 108, 109, 110

See application file for complete search history.

(56) References Cited

U.S. PATENT DOCUMENTS

| | | | | |
|---|---|---|---|---|
| 2012/0049646 | A1 | 3/2012 | Teramoto et al. | |
| 2015/0236515 | A1 | 8/2015 | Yoshida et al. | |
| 2016/0218523 | A1* | 7/2016 | Curtis .................. | H02J 7/0004 |
| 2017/0117736 | A1* | 4/2017 | Katsumata ............ | H01M 10/44 |

FOREIGN PATENT DOCUMENTS

| | | | |
|---|---|---|---|
| JP | 2014-60822 | A | 4/2014 |
| JP | 5659704 | B2 | 1/2015 |

* cited by examiner

*Primary Examiner* — Brian Ngo

(74) *Attorney, Agent, or Firm* — Sughrue Mion, PLLC

(57) ABSTRACT

An electronic apparatus includes a secondary battery that stores power for operation, a power receiver that receives power wirelessly from a power supply device, a decision unit that decides whether or not to allow charging with the power received wirelessly, and a charging unit that charges the secondary battery with the received power if charging with the power received wirelessly is allowed.

19 Claims, 20 Drawing Sheets

200
201
211
CPU
212
ROM
213
RAM
205
WIRELESS COMMUNICATION UNIT
204
WIRELESS POWER RECEIVING UNIT
203
POWER SOURCE CONTROL UNIT
202
SECONDARY BATTERY
POWER LEVEL INFORMATION
POWER
SIGNAL
WIRELESS COMMUNICATION
POWER SUPPLY
300
304
WIRELESS COMMUNICATION UNIT
303
WIRELESS POWER SUPPLY UNIT
302
POWER SOURCE UNIT
301
311
CPU
312
ROM
313
RAM
100

FACTORY
STORE WAREHOUSE
USER HOME
DELIVERY
STORAGE
PACKED STATE
WIRELESS CHARGING ALLOWED PERIOD
UNPACKED STATE
WIRED CHARGING PERIOD
200
400
200
300
400
100
200
400

200A
201
211
CPU
212
ROM
213
RAM
ILLUMINATION SENSOR
206
205
WIRELESS COMMUNICATION UNIT
204
WIRELESS POWER RECEIVING UNIT
203
POWER SOURCE CONTROL UNIT
202
SECONDARY BATTERY
POWER
SIGNAL
WIRELESS COMMUNICATION
POWER SUPPLY
300
304
WIRELESS COMMUNICATION UNIT
303
WIRELESS POWER SUPPLY UNIT
302
POWER SOURCE UNIT
301
311
CPU
312
ROM
313
RAM
100

FACTORY
STORE WAREHOUSE
STORE
USER HOME
DELIVERY
STORAGE
UNPACKING
WIRELESS CHARGING ALLOWED PERIOD
WIRED CHARGING PERIOD
·INITIAL SETUP OPERATIONS
·USAGE INITIALIZATION OPERATIONS
200C
400
200C
300
400
100
400
200C

ELECTRONIC APPARATUS, POWER SUPPLY DEVICE, AND WIRELESS POWER SUPPLY SYSTEM

CROSS-REFERENCE TO RELATED APPLICATIONS

This application is based on and claims priority under 35 USC 119 from Japanese Patent Application No. 2016-201814 filed Oct. 13, 2016.

BACKGROUND

Technical Field

The present invention relates to an electronic apparatus, a power supply device, and a wireless power supply system.

SUMMARY

According to an aspect of the invention, there is provided an electronic apparatus including a secondary battery that stores power for operation, a power receiver that receives power wirelessly from a power supply device, a decision unit that decides whether or not to allow charging with the power received wirelessly, and a charging unit that charges the secondary battery with the received power if charging with the power received wirelessly is allowed.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail and with reference to the attached drawings.

Exemplary Embodiment 1

<Configuration of Wireless Power Supply System>

Figure 1:
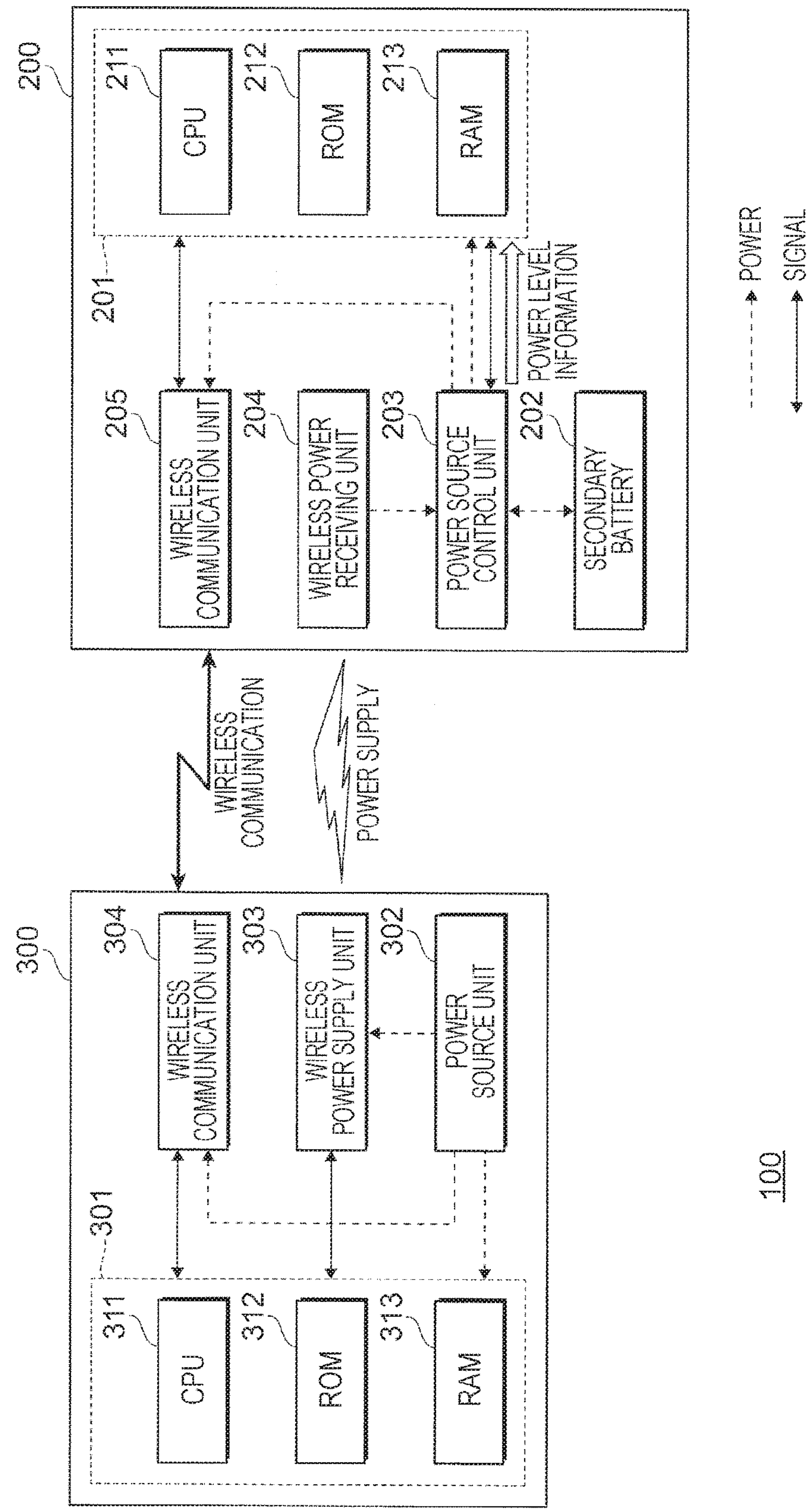
FIG. 1 is a diagram illustrating an exemplary conceptual configuration of a wireless power supply system used by Exemplary Embodiment 1.

FIG. 1 is a diagram illustrating an exemplary conceptual configuration of a wireless power supply system 100 used by Exemplary Embodiment 1. The wireless power supply system 100 is made up of an electronic apparatus 200 and a power supply device 300. The wireless power supply system

100 according to the present exemplary embodiment expresses a usage scenario in which the electronic apparatus 200 in a packed state receives power supplied wirelessly from the power supply device 300, and charges a secondary battery 202.

It is sufficient for the electronic apparatus 200 to be provided with the secondary battery 202. The electronic apparatus 200 may be an apparatus such as a smartphone, a notebook computer, or an image forming device that forms an image on a recording medium, for example. The electronic apparatus 200 is made up of a control unit 201 that controls the apparatus as a whole, the secondary battery 202 that supplies power for operation, a power source control unit 203 that controls the operation of charging the secondary battery 202 and the operation of supplying power to each component of the apparatus, a wireless power receiving unit 204 that receives power wirelessly from an external device, a wireless communication unit 205 used to conduct wireless communication with an external device, and respective components (not illustrated) that differ depending on the product. The respective components which are not illustrated may include, for example, a display device that displays information, and an operating unit that accepts operations.

The respective components that constitute the electronic apparatus 200 are connected to the control unit 201. The control unit 201 is made up of a central processing unit (CPU) 211, read-only memory (ROM) 212, and random access memory (RAM) 213. The ROM 212 stores programs executed by the CPU 211. The CPU 211 reads out a program stored in the ROM 212, and executes the program using the RAM 213 as a work area. Through the execution of the program, the CPU 211 controls each functional unit constituting the electronic apparatus 200. In the case of the present exemplary embodiment, the control unit 201 is used exclusively to control the charging of the secondary battery 202. The control unit 201 operating from this perspective is an example of a decision unit.

The secondary battery 202 is a battery which may be used as a battery that stores electricity by being charged. The capacity, size, and type of the secondary battery 202 depends on the product type of the electronic apparatus 200. Electricity accumulated in the secondary battery 202 is lost gradually due to natural discharge and standby current. In addition, electricity accumulated in the secondary battery 202 is also lost in cases in which a firmware update operation is executed while the electronic apparatus 200 is on the distribution route.

The power source control unit 203 is connected to the wireless power receiving unit 204 and the secondary battery 202, and executes an operation of charging the secondary battery 202 with received power, and an operation of supplying power stored in the secondary battery 202 to respective components. The power reception may be power reception over a power cable, or wireless power reception. In the present exemplary embodiment, the case of wireless power reception is examined. Basically, the power source control unit 203 operates by receiving a supply of power from the secondary battery 202. The power source control unit 203 is made up of a power management integrated circuit (IC), a rectifying diode, and the like, for example. In the case of the present exemplary embodiment, the power management IC is also provided with a function of measuring the power level of the secondary battery 202.

For the method of measuring the power level, any of a voltage measurement method, a coulomb counter method, a battery cell modeling method, and an impedance track method may be used. The measured power level is output as power level information from the power source control unit 203 to the control unit 201. The power source control unit 203 is an example of a charging unit.

Figure 2:
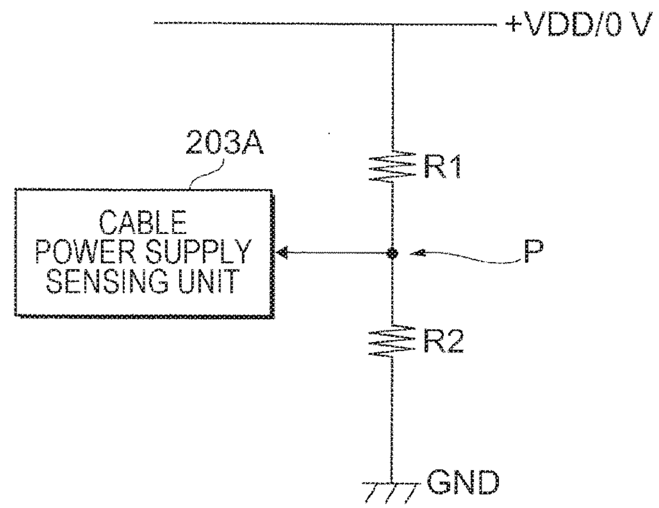
FIG. 2 is a diagram that describes a function of sensing whether or not power is supplied from a power cable.

In the case of the present exemplary embodiment, the power source control unit 203 is provided with a function of toggling the extent to which to supply power, depending on whether or not the electronic apparatus 200 is receiving power from a power cable (not illustrated). FIG. 2 is a diagram that describes a function of sensing whether or not power is supplied from a power cable. A power line turns on when there is a supply of power (+VDD) from the power cable. Between the power line and the ground GND, resistors R1 and R2 are connected in series. The resistance of the resistor R2 is greater than the resistance of the resistor R1. In this case, when the power line turns on, an electric potential of +VDD is produced at the point P, whereas when the power source VDD is off, the ground potential is produced at the point P.

A cable power supply sensing unit 203A monitors the potential appearing at the point P. When the potential appearing at the point P is +VDD, the cable power supply sensing unit 203A senses that the power cable is connected. In this case, the power source control unit 203 operates in a normal mode that also supplies power to functional units not illustrated in FIG. 1 (for example, a display device). On the other hand, when the potential appearing at the point P is the ground potential, the cable power supply sensing unit 203A senses that the power cable is disconnected. In this case, the power source control unit 203 operates in a power-saving mode that supplies power only to the control unit 201 and the wireless communication unit 205. Since the extent of the supply of power is limited in the case of the power-saving mode, consumption of the power accumulated in the secondary battery 202 is reduced.

Returning to the description of FIG. 1, the wireless power receiving unit 204 is a device that receives power supplied wirelessly from the power supply device 300. The wireless power receiving unit 204 is an example of a power receiver. The configuration of the wireless power receiving unit 204 depends on the power propagation method. In the case of the present exemplary embodiment, a radio wave reception method is adopted for the propagation of power. For this reason, the wireless power receiving unit 204 includes an antenna and a rectification circuit (not illustrated). The wireless power receiving unit 204 receives an electromagnetic wave with the antenna, converts the electromagnetic wave into direct current with the rectification circuit, and outputs the direct current to the power source control unit 203. Note that for the propagation of power, any of an electromagnetic induction method, a magnetic resonance method, or a microwave discharge method may also be used.

The wireless communication unit 205 is used for wireless communication with an external device. The wireless communication unit 205 may be dedicated for communication with the power supply device 300, or may be a general-purpose communication device which may also be used for wireless communication with other external devices. Note that the position of the electronic apparatus 200 may also be reported to the power supply device 300 via the wireless communication unit 205. In this case, power may supplied from the power supply device 300 to the electronic apparatus 200 more efficiently.

The power supply device 300 according to the present exemplary embodiment is made up of a control unit 301 that controls the device as a whole, a power source unit 302 that supplies power to respective components of the device, a wireless power supply unit 303 that supplies power wirelessly to an external device, and a wireless communication unit 304 that communicates wirelessly with an external device.

The respective components that constitute the power supply device 300 are connected to the control unit 301. The control unit 301 is made up of a central processing unit (CPU) 311, read-only memory (ROM) 312, and random access memory (RAM) 313. The ROM 312 stores programs executed by the CPU 311. The CPU 311 reads out a program stored in the ROM 312, and executes the program using the RAM 313 as a work area. Through the execution of the program, the CPU 311 controls each functional unit constituting the power supply device 300. The control unit 301 is an example of a controller.

The power source unit 302 distributes a supply of power received from an electric utility to the respective components of the device. In the case of the present exemplary embodiment, the wireless power supply unit 303 adopts a radio wave reception method for the propagation of power. The wireless communication unit 304 communicates wirelessly with the electronic apparatus 200 to which power is supplied.

<Functional Configuration of Control Unit Constituting Electronic Apparatus>

Figure 3:
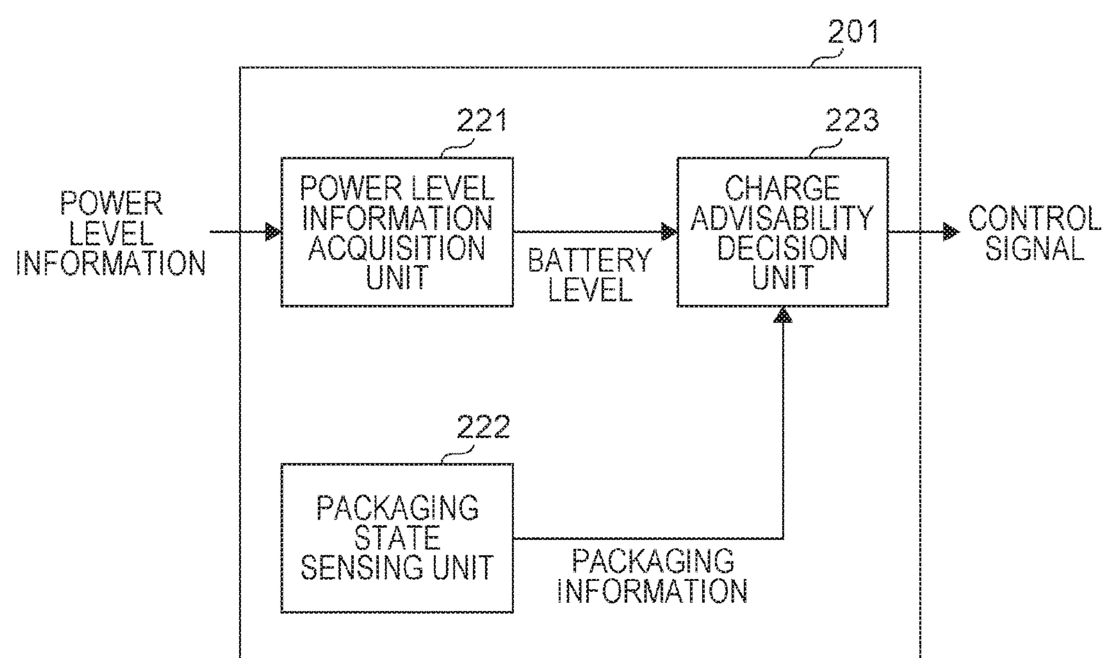
FIG. 3 is a block diagram illustrating an example of a functional configuration related to wireless charging from among various functions executed by a control unit of an electronic apparatus according to Exemplary Embodiment 1.

Next, a functional configuration of the control unit 201 will be described. FIG. 3 is a block diagram illustrating an example of a functional configuration related to wireless charging from among various functions executed by the control unit 201 according to Exemplary Embodiment 1. The control unit 201 is made up of a power level information acquisition unit 221 that acquires power level information, a packaging state sensing unit 222 that senses whether or not the electronic apparatus 200 is packed, and a charge advisability decision unit 223 that decides whether or not to allow charging of the secondary battery 202 with power received wirelessly. These functions correspond to an example of a decision unit.

The power level information acquisition unit 221 acquires power level information measured by the power source control unit 203, and outputs the power level information to the charge advisability decision unit 223 as battery level information. The packaging state sensing unit 222 senses whether or not the electronic apparatus 200 is in a packed state, on the basis of an illumination value measured by an illumination sensor provided in the electronic apparatus 200, or communication with an electronic tag affixed to a packaging material, for example. The packaging state sensing unit 222 outputs the sensing result to the charge advisability decision unit 223 as packaging information.

The charge advisability decision unit 223 according to the present exemplary embodiment decides whether or not to allow charging of the secondary battery 202 with power received wirelessly, on the basis of the battery level information and the packaging information. The charge advisability decision unit 223 allows charging of the secondary battery 202 when the electronic apparatus 200 is in the packed state, and the power level is low.

Consequently, if the electronic apparatus 200 is in the packed state but the power level is high, charging of the secondary battery 202 with power received wirelessly is not allowed. Also, if the power level is low but the electronic apparatus 200 is not in the packed state (that is, if the electronic apparatus 200 is in an unpacked state), charging of the secondary battery 202 with power received wirelessly is not allowed. This is because in the latter case, the electronic apparatus 200 has been taken out from the packaging material, and thus charging from the power cable rather than selecting wireless charging results in a shorter charging time. A control signal to allow or not allow charging is output from the control unit 201 to the power source control unit 203.

<Usage Scenario of Wireless Power Supply System>

Figure 4:
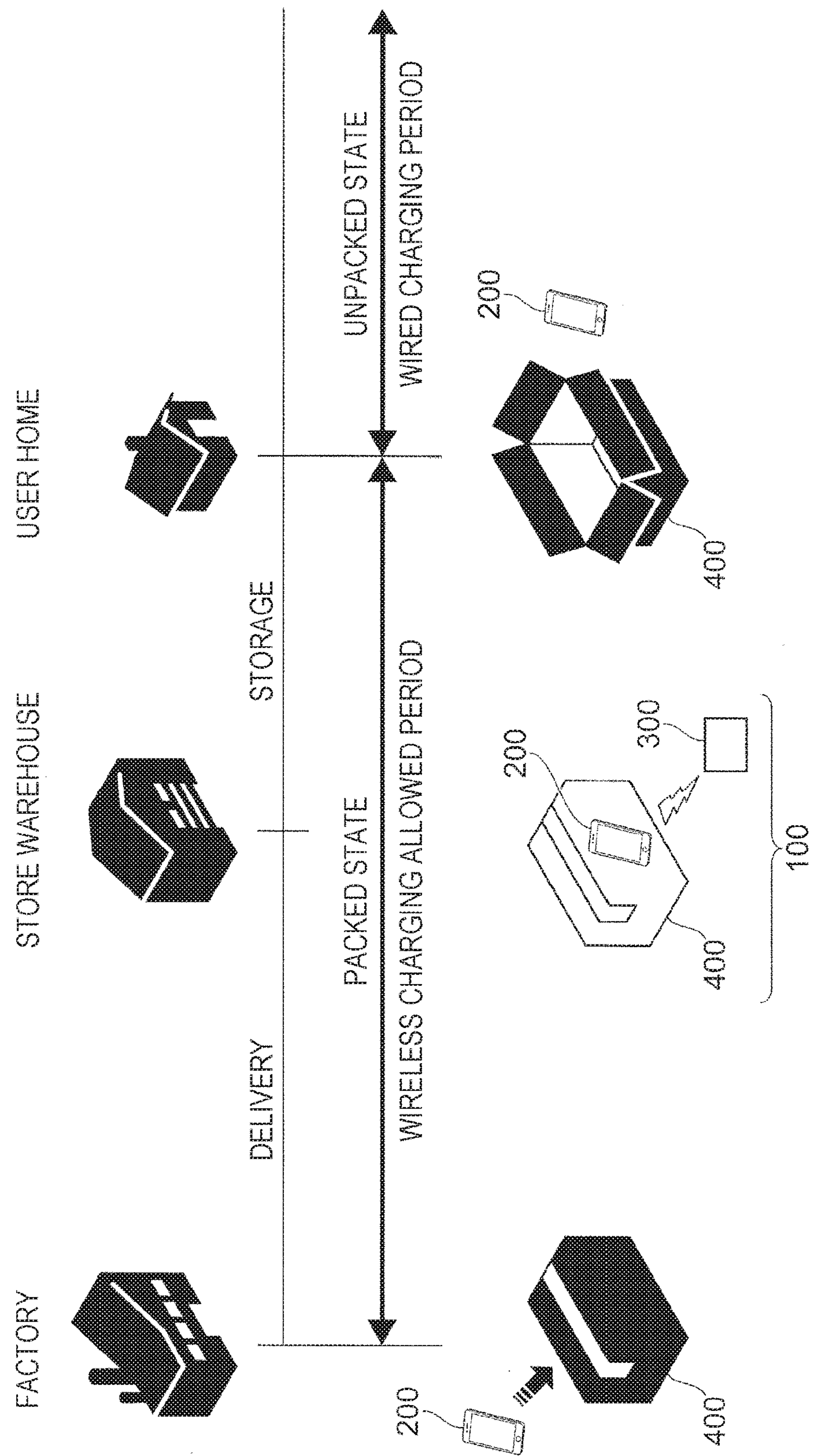
FIG. 4 is a diagram describing a usage scenario of a wireless power supply system according to Exemplary Embodiment 1.

FIG. 4 is a diagram describing a usage scenario of the wireless power supply system 100 according to Exemplary Embodiment 1. In the case of the present exemplary embodiment, the power supply device 300 is used in the wireless charging allowed period illustrated in the drawing. The power supply device 300 is installed in a warehouse of a store, for example, and is used with respect to an electronic apparatus 200 stored in the warehouse in the packed state.

As illustrated in FIG. 4, the electronic apparatus 200 is packed in a packaging material 400 not only during delivery from the factory, but also during storage at a warehouse or a store. The power level of the secondary battery 202 decreases due to factors such as natural discharge, standby current, and firmware updates. For this reason, it is desirable to restore the power level of the secondary battery 202 before handing over the electronic apparatus 200 to a user, so that the user receiving the electronic apparatus 200 is not impeded in the use of the electronic apparatus 200.

However, a technique of opening the packaging material 400 to take out and charge the electronic apparatus 200 with a power cable involves a series of operations including unpacking work, charging work, and repacking work, which imposes a large burden on the worker. In contrast, if power is supplied wirelessly from the power supply device 300 to charge the electronic apparatus 200, the burden on the charging worker is reduced greatly. Also, charging is not only not necessary for a secondary battery 202 at a high power level or an electronic apparatus 200 already under the user's management, but furthermore wastefully increases the number of charge cycles. The exemplary embodiments address such technical issues.

<Processing Sequence Executed by Electronic Apparatus>

Figure 5:
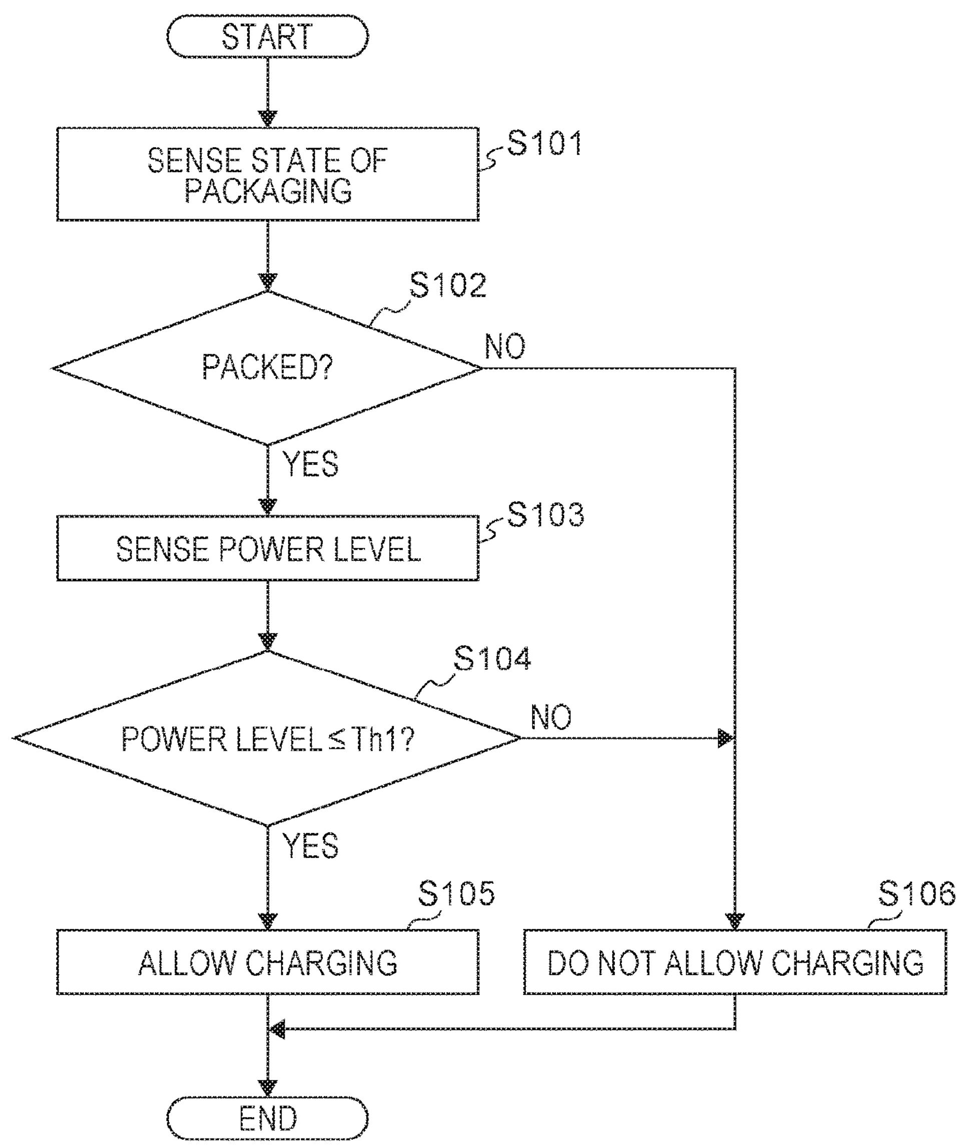
FIG. 5 is a flowchart illustrating an example of a processing sequence executed by a charge advisability decision unit according to Exemplary Embodiment 1.

Next, a sequence of wireless charging operations executed by the electronic apparatus 200 according to the present exemplary embodiment will be described. In the case of the present exemplary embodiment, the decision of whether or not to charge is executed internally inside the electronic apparatus 200. FIG. 5 is a flowchart illustrating an example of a processing sequence executed by the charge advisability decision unit 223 according to Exemplary Embodiment 1. The charge advisability decision unit 223 repeatedly executes the process of the flowchart illustrated in FIG. 5.

First, the charge advisability decision unit 223 acquires packaging information from the packaging state sensing unit 222, and senses the state of packaging of the electronic apparatus 200 itself (step 101). Next, the charge advisability decision unit 223 determines whether or not the electronic apparatus 200 itself is packed (step 102). In the case of a positive result in step 102 (that is, if the electronic apparatus 200 is packed), the charge advisability decision unit 223 acquires the battery level from the power level information acquisition unit 221, and senses the power level of the secondary battery 202 (step 103). Next, the charge advisability decision unit 223 determines whether or not the power level is less than or equal to a predetermined threshold value Th1 (step 104).

If a positive result is obtained in step 104, the charge advisability decision unit 223 outputs a control signal allowing charging to the power source control unit 203 (step 105). In this case, if there is power transferred from the wireless power receiving unit 204, the wireless power receiving unit 204 uses this power to charge the secondary battery 202. Obviously, even if charging is allowed, the secondary battery 202 is not charged if the wireless power receiving unit 204 does not receive a supply of power wirelessly from the power supply device 300.

If a negative result is obtained in step 102 or step 104, the charge advisability decision unit 223 outputs a control signal not allowing charging to the power source control unit 203 (step 106). While this control signal is being output, the power source control unit 203 does not charge the secondary battery 202, even if wirelessly supplied power exists.

As above, according to the present exemplary embodiment, since the electronic apparatus 200 does not indiscriminately charge the secondary battery 202 whenever a supply of power is received wirelessly from the power supply device 300, the execution of unnecessary charging operations is avoided. For example, even if power is supplied wirelessly from the power supply device 300 to multiple electronic apparatuses 200 being stored in the packed state in a warehouse, the secondary battery 202 is not charged if the power level is high. Also, even if an electronic apparatus 200 that has started being used by a user exists in the power-supplying range, charging in a form that the user does not want is avoided.

Note that in the present exemplary embodiment, both the battery level and packaging information are used to judge whether or not to allow charging, but the charging of the secondary battery 202 may also be controlled using just the packaging information. In this case, the secondary batteries 202 in all electronic apparatuses 200 within range of receiving the wirelessly supplied power become fully charged.

Exemplary Embodiment 2

<Configuration of Wireless Power Supply System>

Figure 6:
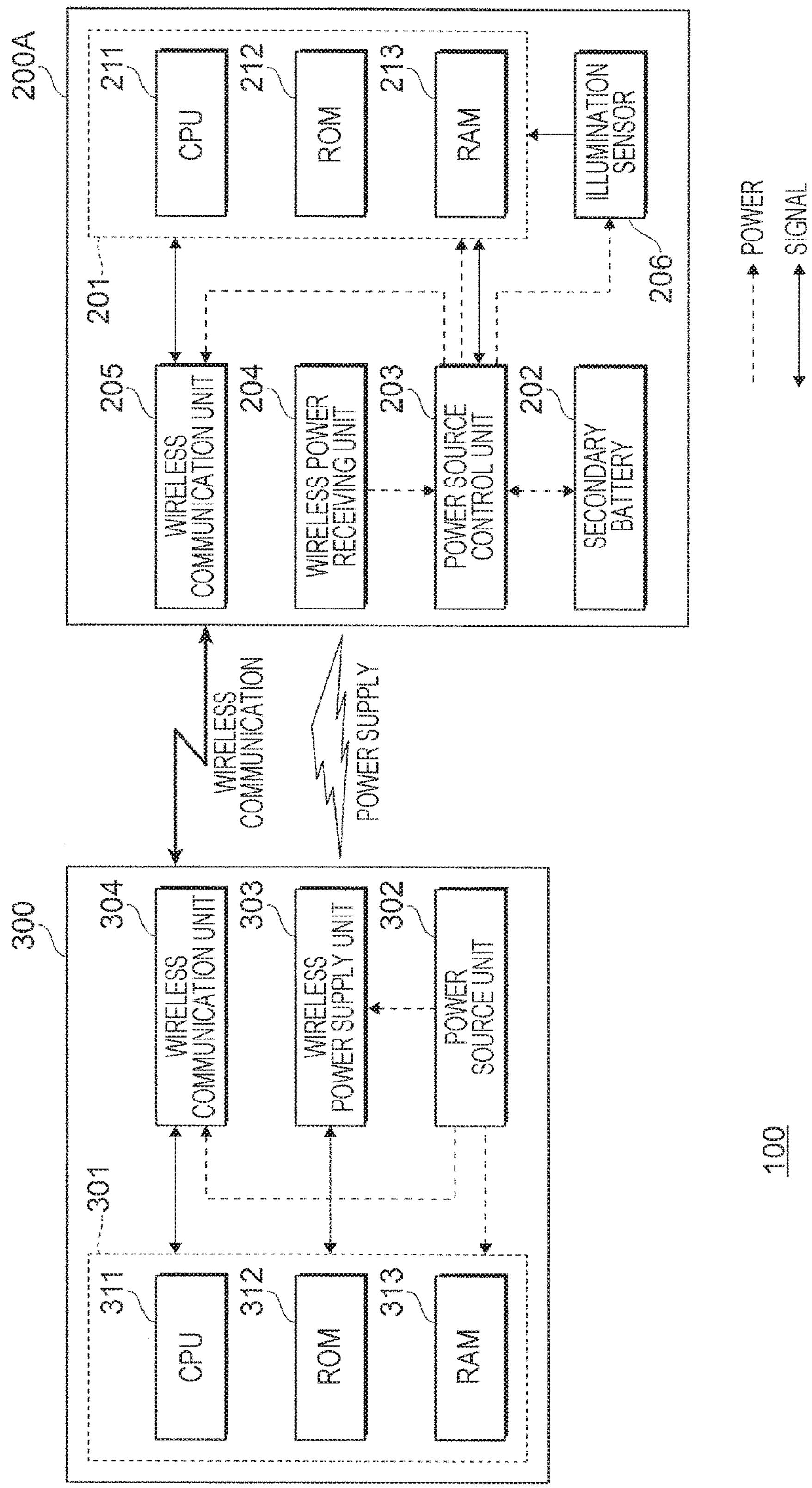
FIG. 6 is a diagram illustrating an exemplary conceptual configuration of a wireless power supply system used by Exemplary Embodiment 2.

FIG. 6 is a diagram illustrating an exemplary conceptual configuration of a wireless power supply system 100 used by Exemplary Embodiment 2. The wireless power supply system 100 according to the present exemplary embodiment is made up of an electronic apparatus 200A and a power supply device 300.

Exemplary Embodiment 2 is different from Exemplary Embodiment 1 discussed above in that the illumination around the electronic apparatus 200A is used as a specific method of sensing the state of packaging. Consequently, the wireless power supply system 100 illustrated in FIG. 6 is provided with an illumination sensor 206. As illustrated in FIG. 6, the illumination sensor 206 is supplied with power from the power source control unit 203 operating in the power-saving mode, even during the packed period. The output of the illumination sensor 206 may be used not only to determine whether or not the electronic apparatus 200A is in the packed state, but also for the purpose of sensing the brightness of the housing surface during use.

The light-sensing face of the illumination sensor 206 is placed at some location on the housing surface so that the illumination on the housing surface of the electronic apparatus 200A may be measured. In the present exemplary embodiment, the light-sensing face of the illumination sensor 206 is placed at a position facing the part where the lid of the packaging material opens and closes. In other words, the light-sensing face of the illumination sensor 206 is placed at a position so that when the lid of the packaging material is opened during the unpacking, external light incident from the opening shines onto the light-sensing face of the illumination sensor 206.

<Functional Configuration of Control Unit Constituting Electronic Apparatus>

Figure 7:
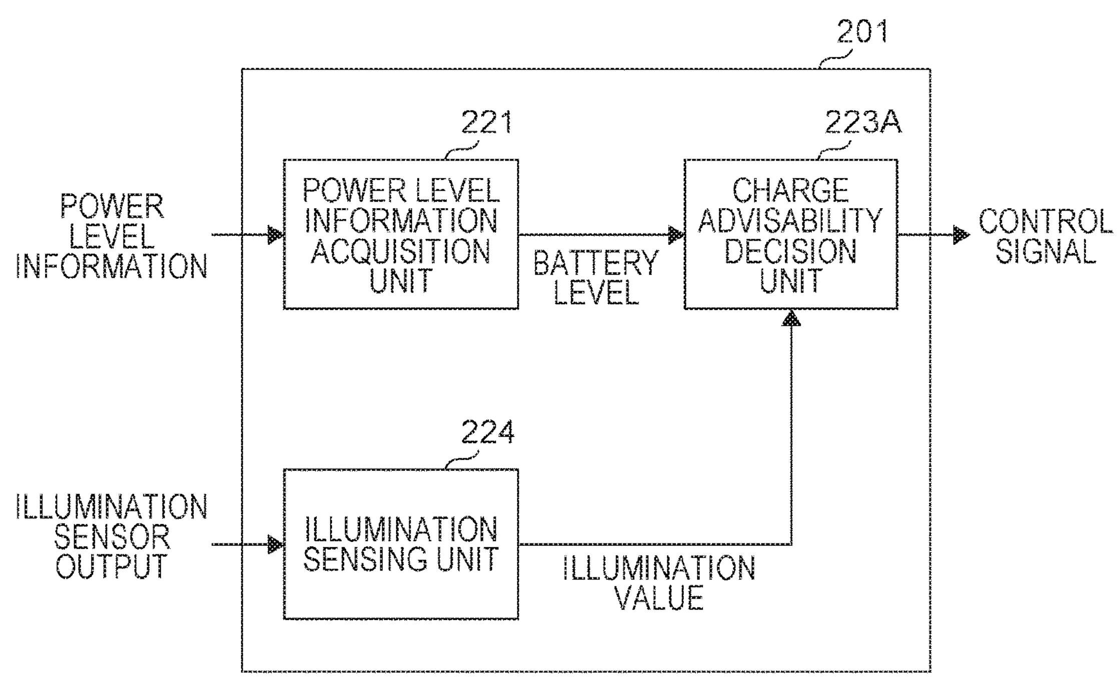
FIG. 7 is a block diagram illustrating an example of a functional configuration related to wireless charging from among various functions executed by a control unit of an electronic apparatus according to Exemplary Embodiment 2.

Next, a functional configuration of the control unit 201 will be described. FIG. 7 is a block diagram illustrating an example of a functional configuration related to wireless charging from among various functions executed by the control unit 201 according to Exemplary Embodiment 2. The control unit 201 illustrated in FIG. 7 is made up of a power level information acquisition unit 221 that acquires power level information, an illumination sensing unit 224 that acquires the output from the illumination sensor 206, and a charge advisability decision unit 223A that decides whether or not to allow charging of the secondary battery 202 with power received wirelessly. These functions correspond to an example of a decision unit.

The function of the power level information acquisition unit 221 is shared in common with the function according to Exemplary Embodiment 1. The illumination sensing unit 224 computes an illumination value from the output value of the illumination sensor 206, and outputs the computed illumination value to the charge advisability decision unit 223A. The charge advisability decision unit 223A decides whether or not to allow charging of the secondary battery 202 with power received wirelessly, on the basis of the battery level and the illumination value. In the present exemplary embodiment, the charge advisability decision unit 223A allows charging of the secondary battery 202 when the illumination value is less than a predetermined threshold value, and the power level is low. This is because the illumination measured while the electronic apparatus 200A is in the packed state is lower than the illumination measured when the electronic apparatus 200A is in the unpacked state.

<Processing Sequence Executed by Electronic Apparatus>

Figure 8:
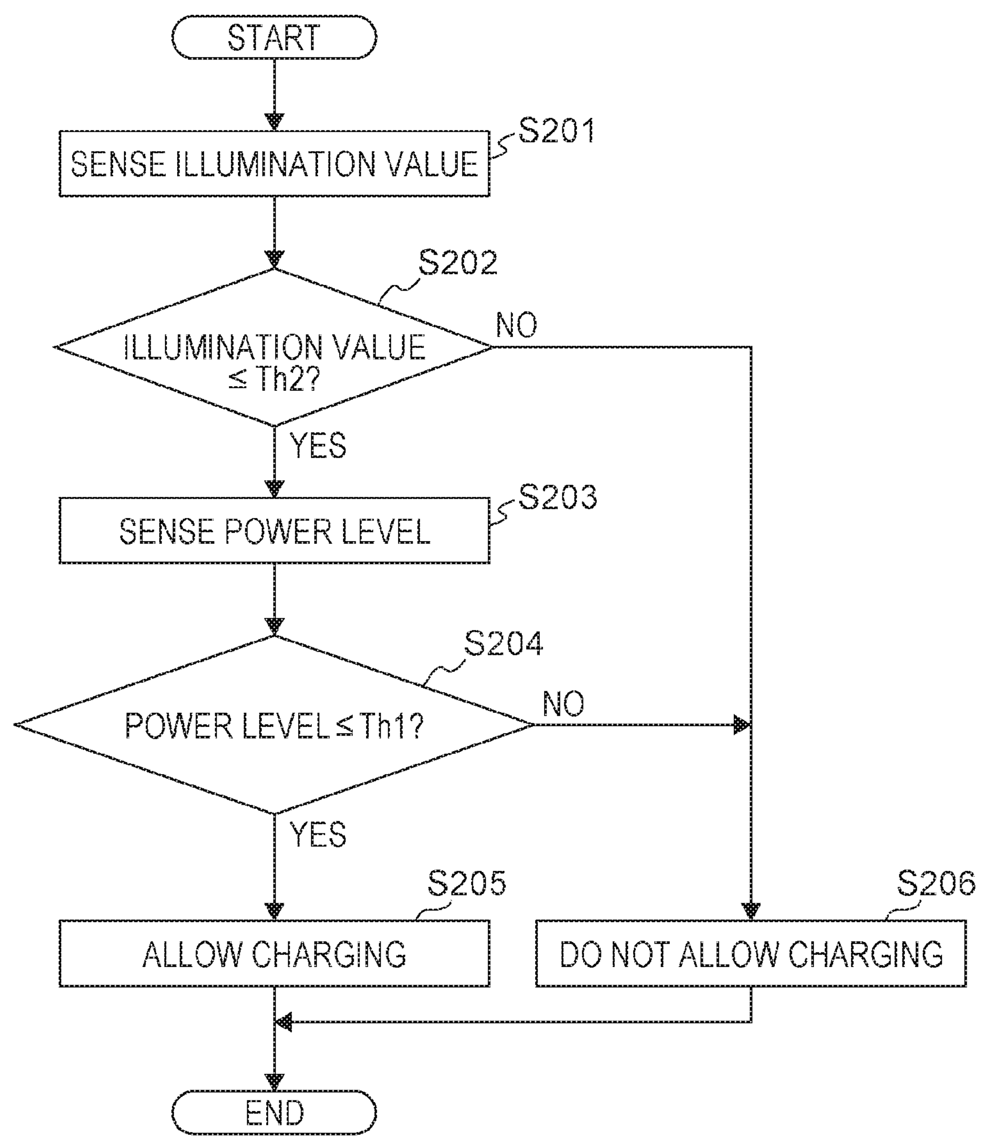
FIG. 8 is a flowchart illustrating an example of a processing sequence executed by a charge advisability decision unit according to Exemplary Embodiment 2.

Next, a sequence of wireless charging operations executed by the electronic apparatus 200A according to the present exemplary embodiment will be described. In the case of the present exemplary embodiment, the decision of whether or not to charge likewise is executed internally inside the electronic apparatus 200A. FIG. 8 is a flowchart illustrating an example of a processing sequence executed by the charge advisability decision unit 223A according to Exemplary Embodiment 2. The charge advisability decision unit 223A repeatedly executes the process of the flowchart illustrated in FIG. 8.

First, the charge advisability decision unit 223A acquires the output of the illumination sensor 206, and senses the illumination value on the housing surface of the electronic apparatus 200A itself (step 201). Next, the charge advisability decision unit 223A determines whether or not the illumination value is less than or equal to a predetermined threshold value Th2 (step 202). If a positive result is obtained in step 202 (that is, if the electronic apparatus 200A is in the packed state), the charge advisability decision unit 223A acquires the battery level from the power level information acquisition unit 221, and senses the power level of the secondary battery 202 (step 203). Next, the charge advisability decision unit 223A determines whether or not the power level is less than or equal to a predetermined threshold value Th1 (step 204).

If a positive result is obtained in step 204, the charge advisability decision unit 223A outputs a control signal allowing charging to the power source control unit 203 (step 205). In this case, if there is power transferred from the wireless power receiving unit 204, the wireless power receiving unit 204 uses this power to charge the secondary battery 202. Obviously, even if charging is allowed, the secondary battery 202 is not charged if the wireless power receiving unit 204 does not receive a supply of power wirelessly from the power supply device 300.

If a negative result is obtained in step 202 or step 204, the charge advisability decision unit 223A outputs a control signal not allowing charging to the power source control unit 203 (step 206). While this control signal is being output, the power source control unit 203 does not charge the secondary battery 202, even if wirelessly supplied power exists.

As above, in the present exemplary embodiment, the illumination on the housing surface of the electronic apparatus 200A is used as a physical quantity for sensing the state of packaging. When the lid of the packaging material 400 is opened, external light enters the interior of the packaging material and brightens the area around the electronic apparatus 200A. Consequently, if the illumination value is not less than or equal to the predetermined threshold value Th2, it is reliably sensed that the packaging material of the electronic apparatus 200A has been opened.

Consequently, the electronic apparatus 200A does not indiscriminately charge the secondary battery 202 whenever a supply of power is received wirelessly from the power supply device 300, and an increase in the number of charge cycles due to unnecessary charging operations is avoided.

Exemplary Embodiment 3

Exemplary Embodiment 3 describes a wireless power supply system that decides whether or not the electronic apparatus is in the packed state on the basis of whether or not communication is available with an electronic tag applied so as to straddle across the opening part (the free edge of the lid) of the packaging material 400. First, a usage scenario of Exemplary Embodiment 3 will be described using FIGS. 9 to 11.

Figure 9:
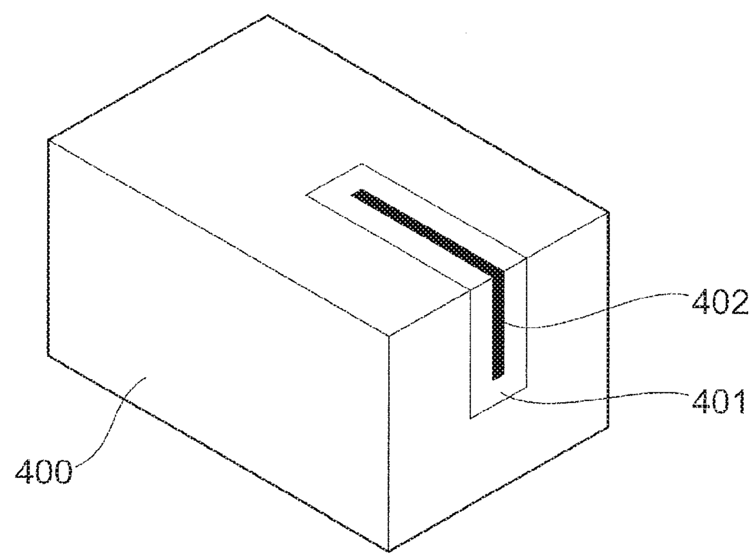
FIG. 9 is a diagram illustrating how a rectangular electronic tag is applied so as to straddle across the opening part of a box-shaped packaging material used to package an electronic apparatus.
Figure 10:
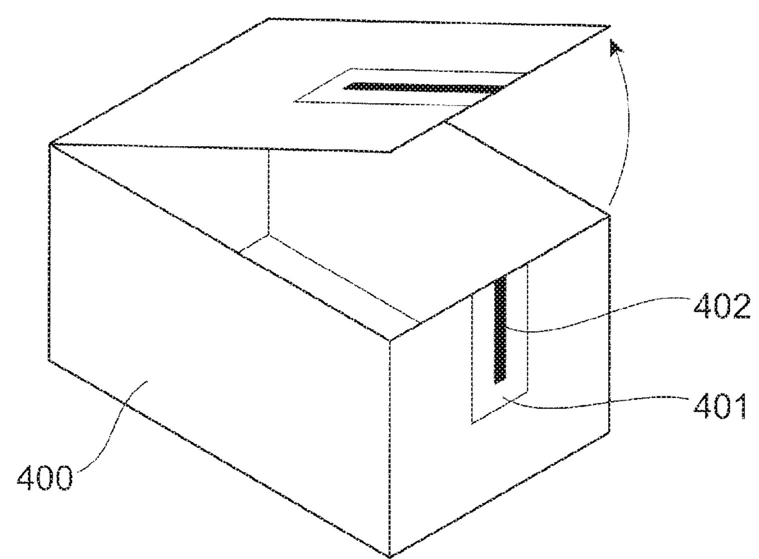
FIG. 10 is a diagram illustrating a state in which the free edge of a lid of packaging material is opened away from the main body, or in other words, the unpacked state.

FIG. 9 is a diagram illustrating how a rectangular electronic tag 401 is applied so as to straddle across the opening part of a box-shaped packaging material 400 used to package an electronic apparatus. FIG. 10 is a diagram illustrating a state in which the opening part (the free edge of the lid) of the packaging material 400 is opened away from the main body, or in other words, the unpacked state.

Figure 11:
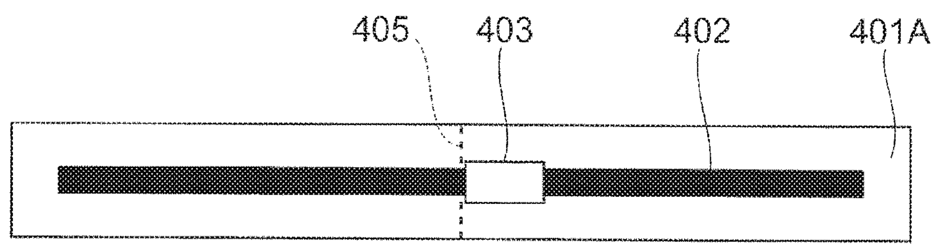
FIG. 11 is a diagram illustrating an exemplary plan-view configuration of an electronic tag.

FIG. 11 is a diagram illustrating an exemplary plan-view configuration of the electronic tag 401. The electronic tag 401 is also called a radio frequency (RF) tag. The electronic tag 401 includes a loop coil antenna 402 printed with conductive ink on the surface of a resin film 401A, and an IC chip 403 from which information is read out when there power is supplied wirelessly to the loop coil antenna 402. The loop coil antenna 402 herein is an example of a conductive member. Note that a groove 405 is formed in the resin film 401A. The groove 405 is provide to reliably sever the loop coil antenna 402. The resin film 401A is affixed to the surface of the packaging material 400, so that the portion of the groove 405 is positioned on the opening part (the free edge of the lid) of the packaging material 400. In the present exemplary embodiment, the electronic tag 401 conforms to a short-range wireless communication scheme.

Returning to the description of FIG. 10, when the lid is opened as illustrated in FIG. 10, the loop coil antenna 402 of the electronic tag 401 is severed at the position of the groove 405, and is separated into two parts. The loop coil antenna 402 severed into two parts in this way no longer functions correctly, and communication with the IC chip 403 becomes unavailable. In other words, the state in which communication with the electronic tag 401 is the packed state, whereas the state in which communication with the electronic tag 401 is unavailable is the unpacked state.

<Configuration of Wireless Power Supply System>

Figure 12:
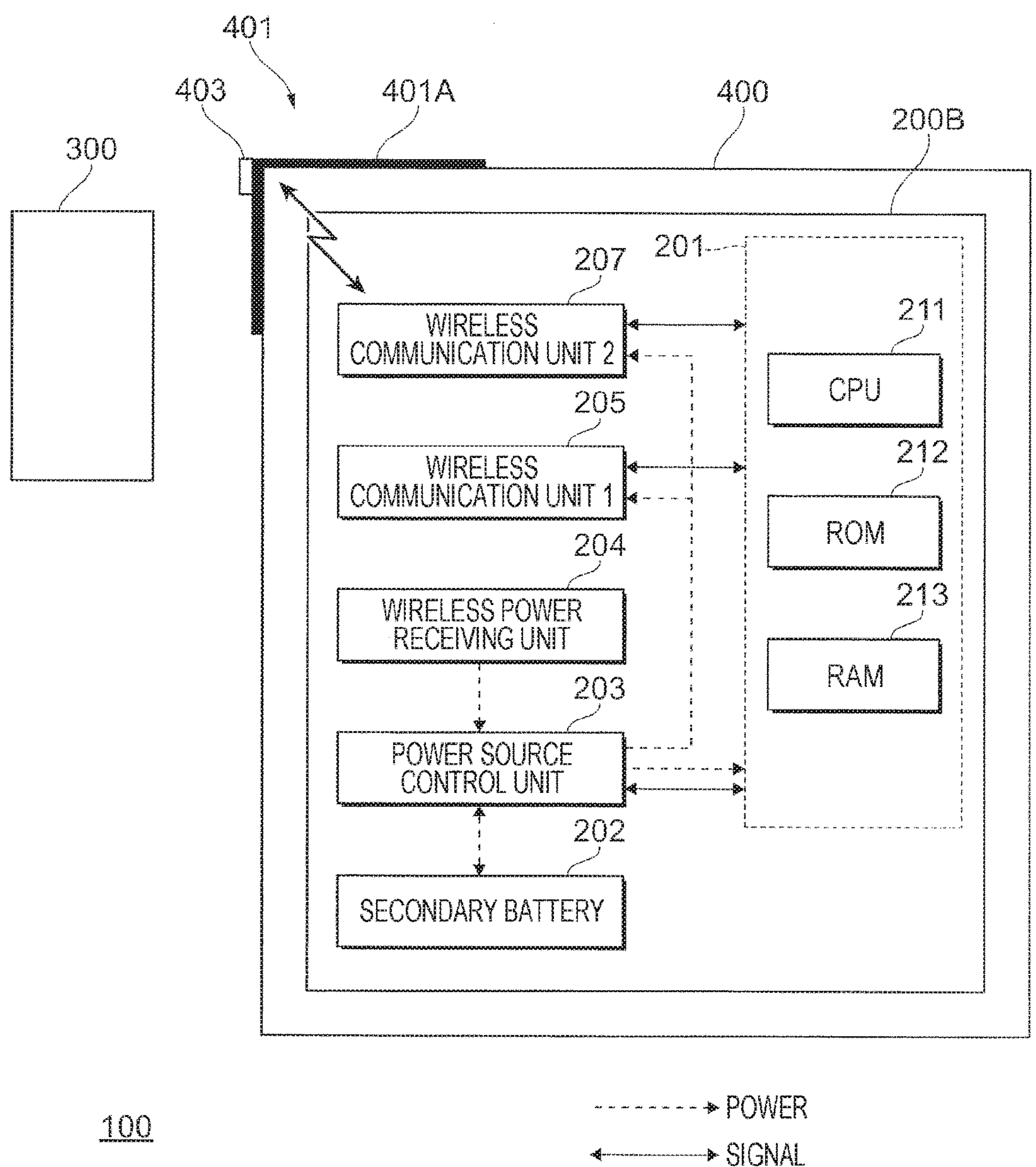
FIG. 12 is a diagram illustrating an exemplary conceptual configuration of a wireless power supply system used by Exemplary Embodiment 3.

FIG. 12 is a diagram illustrating an exemplary conceptual configuration of a wireless power supply system 100 used by Exemplary Embodiment 3. FIG. 12 mostly illustrates the relationship between the electronic apparatus 200B and the box-shaped packaging material 400. The specific configuration of the wireless power supply system 100 is shared in common with Exemplary Embodiments 1 and 2 discussed earlier.

The configuration characteristic to the present exemplary embodiment is that the electronic apparatus 200B is provided with a wireless communication unit 207 used to communicate with the electronic tag 401 affixed to the packaging material 400. The wireless communication unit 207 according to the present exemplary embodiment functions as a reader device in a short-range wireless communication scheme. The electronic tag 401 and the wireless communication unit 207 are arranged so that the communication range determined by the governing communication scheme is not exceeded.

<Functional Configuration of Control Unit Constituting Electronic Apparatus>

Figure 13:
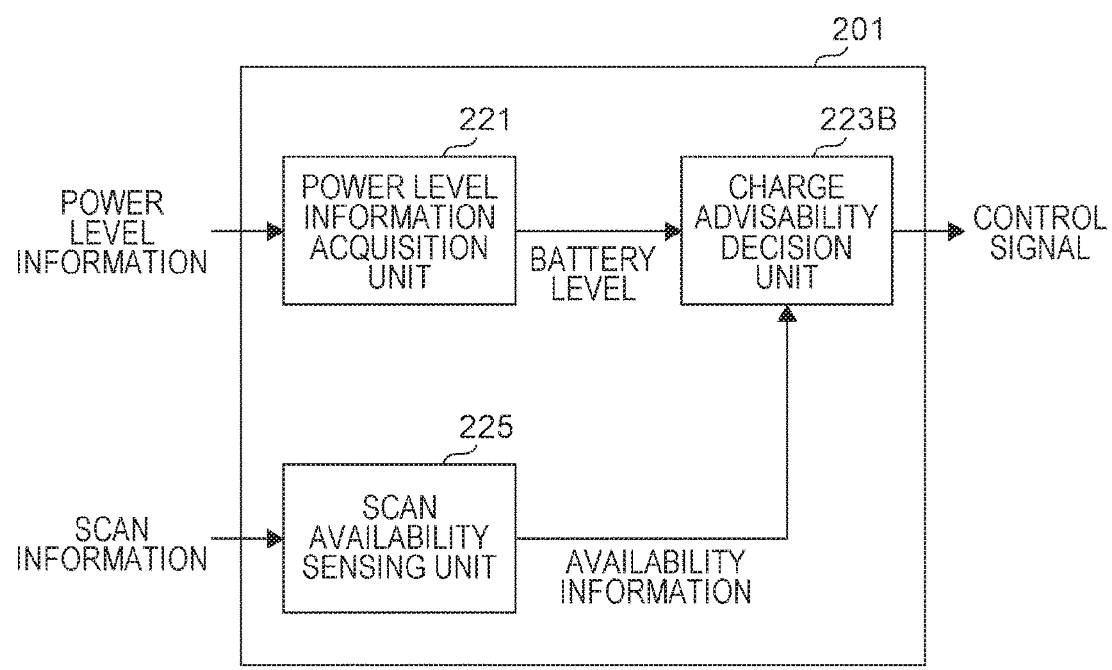
FIG. 13 is a block diagram illustrating an example of a functional configuration related to wireless charging from among various functions executed by a control unit of an electronic apparatus according to Exemplary Embodiment 3.

Next, a functional configuration of the control unit 201 will be described. FIG. 13 is a block diagram illustrating an example of a functional configuration related to wireless charging from among various functions executed by the control unit 201 according to Exemplary Embodiment 3. The control unit 201 illustrated in FIG. 13 is made up of a power level information acquisition unit 221 that acquires power level information, a scan availability sensing unit 225 that reads out information from the electronic tag 401, and a charge advisability decision unit 223B that decides whether or not to allow charging of the secondary battery 202 with power received wirelessly. These functions correspond to an example of a decision unit.

The function of the power level information acquisition unit 221 is shared in common with the function according to Exemplary Embodiment 1. The scan availability sensing unit 225 senses whether or not the wireless communication unit 207 successfully reads out information from the electronic tag 401. In the present exemplary embodiment, a successful read means that the electronic apparatus is in the packed state. For this reason, the scan availability sensing unit 225 outputs “available” as the sensing result. On the other hand, a failure to read means that the electronic apparatus is in the unpacked state. For this reason, the scan availability sensing unit 225 outputs “unavailable” as the sensing result.

The charge advisability decision unit 223B decides whether or not to allow charging of the secondary battery 202 with power received wirelessly, on the basis of the battery level and availability information regarding communication with the electronic tag 401. In the present exemplary embodiment, the charge advisability decision unit 223B allows charging of the secondary battery 202 when communication with the electronic tag 401 is available, and the power level is low.

<Processing Sequence Executed by Electronic Apparatus>

Figure 14:
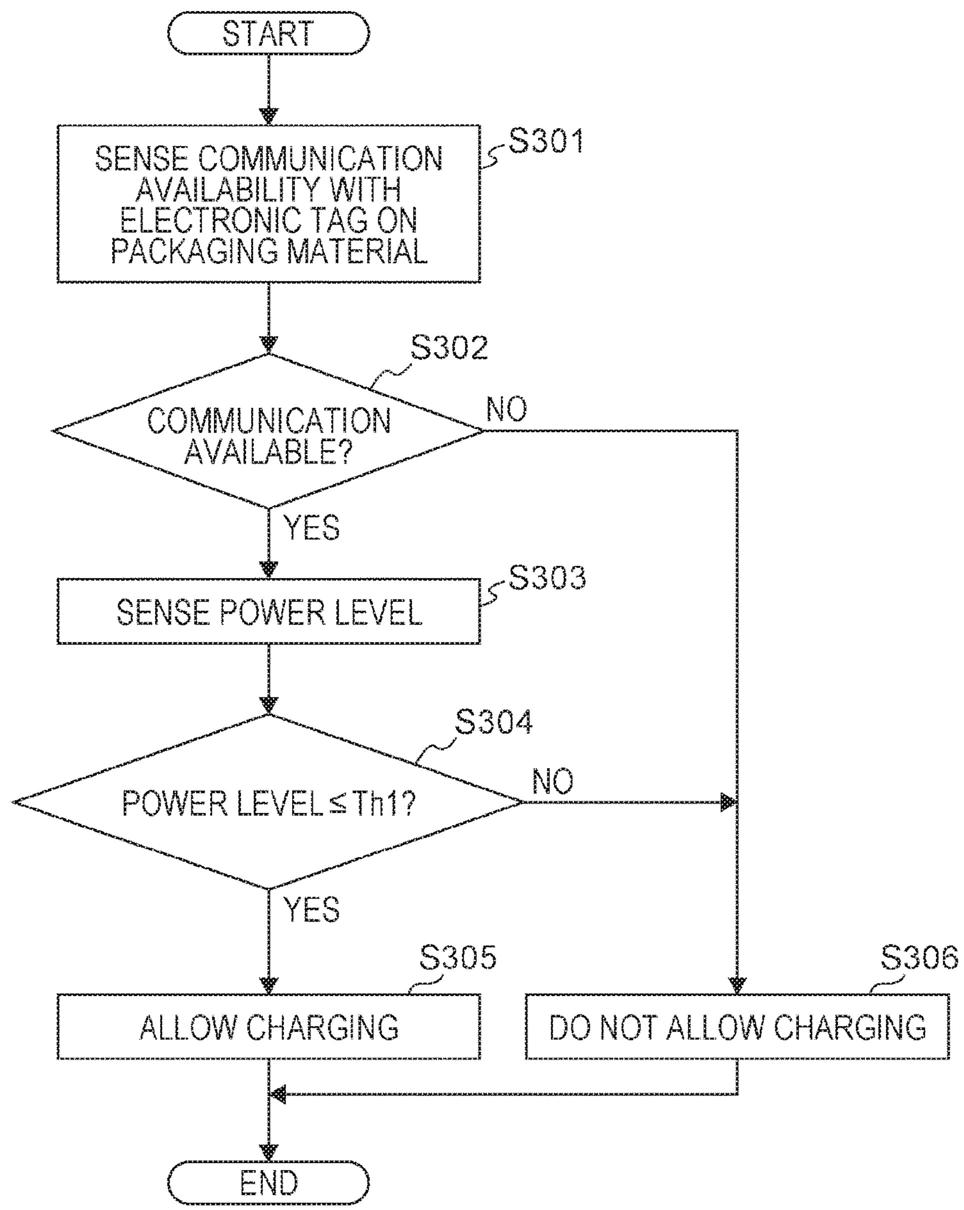
FIG. 14 is a flowchart illustrating an example of a processing sequence executed by a charge advisability decision unit according to Exemplary Embodiment 3.

Next, a sequence of wireless charging operations executed by the electronic apparatus 200B according to the present exemplary embodiment will be described. In the case of the present exemplary embodiment, the determination of whether or not to charge likewise is executed internally inside the electronic apparatus 200B. FIG. 14 is a flowchart illustrating an example of a processing sequence executed by the charge advisability decision unit 223B according to Exemplary Embodiment 3. The charge advisability decision unit 223B repeatedly executes the process of the flowchart illustrated in FIG. 14.

First, the charge advisability decision unit 223B senses the availability of communication between the electronic tag 401 attached to the packaging material 400 and the wireless communication unit 207 of the electronic apparatus 200B itself (step 301). Next, the charge advisability decision unit 223B determines whether or not communication is available (step 302). If a positive result is obtained in step 302 (that is, if the electronic apparatus 200B is in the packed state), the charge advisability decision unit 223B acquires the battery level from the power level information acquisition unit 221, and senses the power level of the secondary battery 202 (step 303). Next, the charge advisability decision unit 223B determines whether or not the power level is less than or equal to a predetermined threshold value Th1 (step 304).

If a positive result is obtained in step 304, the charge advisability decision unit 223B outputs a control signal allowing charging to the power source control unit 203 (step 305). In this case, if there is power transferred from the wireless power receiving unit 204, the wireless power receiving unit 204 uses this power to charge the secondary battery 202. Obviously, even if charging is allowed, the secondary battery 202 is not charged if the wireless power receiving unit 204 does not receive a supply of power wirelessly from the power supply device 300.

If a negative result is obtained in step 302 or step 304, the charge advisability decision unit 223B outputs a control signal not allowing charging to the power source control unit 203 (step 306). While this control signal is being output, the power source control unit 203 does not charge the secondary battery 202, even if wirelessly supplied power exists.

As above, in the present exemplary embodiment, whether or not the electronic apparatus 200B is in the packed state is sensed on the basis of the status of communication with the electronic tag 401 affixed to the packaging material 400. When the opening part (the free edge of the lid) of the packaging material 400 is opened, the loop coil antenna 402 constituting the electronic tag 401 is physically severed, thereby causing the electronic apparatus 200B to become unable to read the information stored in the IC chip 403 of the electronic tag 401. Consequently, if communication with the electronic tag 401 is unavailable, it is confirmed that the packaging material of the electronic apparatus 200B has been opened.

Consequently, since the electronic apparatus 200B does not indiscriminately charge the secondary battery 202 whenever a supply of power is received wirelessly from the power supply device 300, the execution of unnecessary charging operations is avoided. Note that although the foregoing description uses the loop coil antenna 402 as a conductive member, there are no limitations on the type of conductive member, the attachment position, and the attachment method, insofar as the severing of the conductive member due to opening the packaging material may be sensed. For example, a method that propagates power by a radio wave method is also acceptable.

Exemplary Embodiment 4

Figure 15:
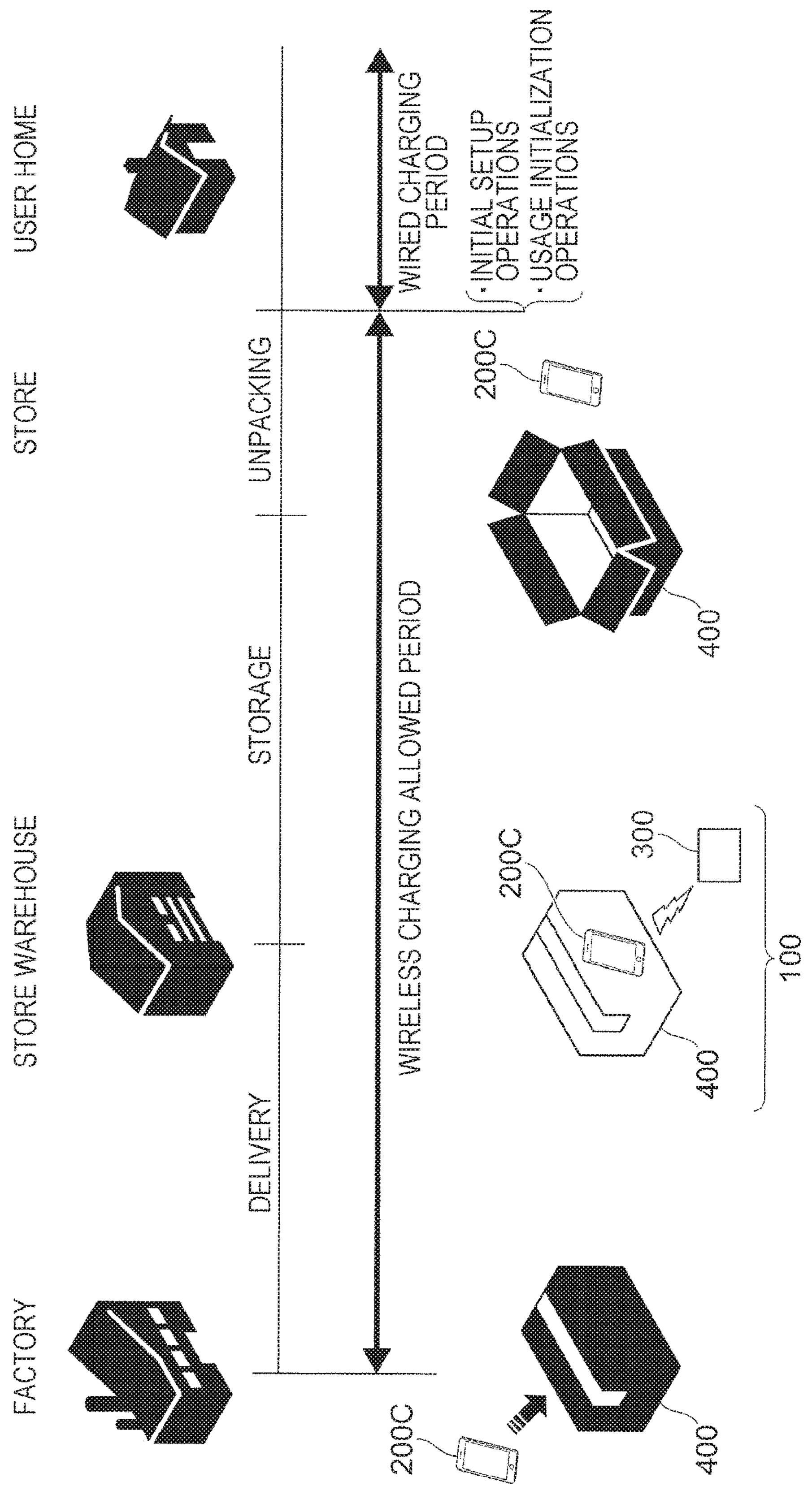
FIG. 15 is a diagram describing a usage scenario of a wireless power supply system according to Exemplary Embodiment 4.

The present exemplary embodiment describes an exemplary embodiment in which charging of the secondary battery 202 with power received wirelessly is still allowed after the packaging material 400 is opened, until a predetermined operation is performed. FIG. 15 is a diagram describing a usage scenario of a wireless power supply system according to Exemplary Embodiment 4. The present exemplary embodiment describes a case in which the wireless charging period also includes initial setup operations and usage initialization operations on an electronic apparatus 200C taken out of the packaging material, which are performed as a service at the store. Obviously, this service is an example.

Even if the electronic apparatus 200C is taken out of the packaging material 400, usage of the electronic apparatus 200C may not be started in some cases until initial setup operations and usage initialization operations (such as pressing a Start button or communicating data with a predetermined server, for example) are performed. Since such operations consume power, it is preferable to charge the secondary battery 202 in advance or in parallel with the operations. Consequently, if such an application is anticipated, it is desirable to decide whether or not to allow wireless charging not only according to whether or not the electronic apparatus 200C is in the packed state, but also according to whether or not a predetermined, specific operation is input into the electronic apparatus 200C. In this case, the worker does not have to pay any particular attention to charging the electronic apparatus 200C.

<Functional Configuration of Control Unit Constituting Electronic Apparatus>

Next, a functional configuration of the control unit 201 will be described. Note that the basic configuration of the wireless power supply system according to the present exemplary embodiment is shared in common with the configuration illustrated in FIG. 1.

Figure 16:
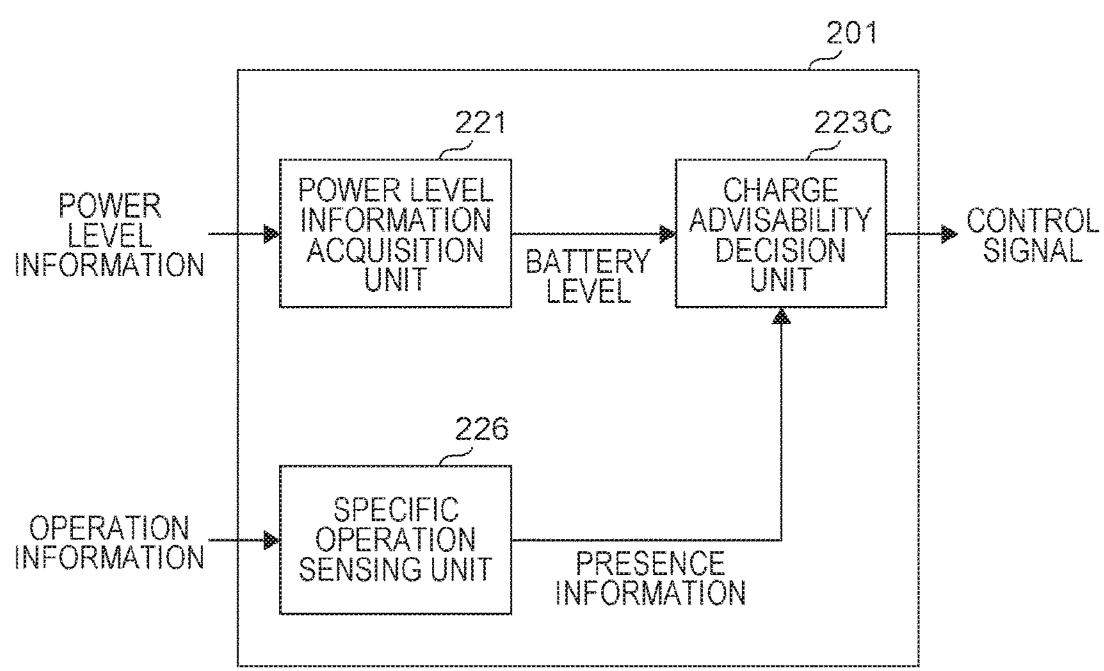
FIG. 16 is a block diagram illustrating an example of a functional configuration related to wireless charging from among various functions executed by a control unit of an electronic apparatus according to Exemplary Embodiment 4.

FIG. 16 is a block diagram illustrating an example of a functional configuration related to wireless charging from among various functions executed by the control unit 201 according to Exemplary Embodiment 4. The control unit 201 illustrated in FIG. 16 is made up of a power level information acquisition unit 221 that acquires power level information, a specific operation sensing unit 226 that senses the presence or absence of a specific operation input via an operating unit (not illustrated), and a charge advisability decision unit 223C that determines whether or not to allow charging of the secondary battery 202 with power received wirelessly. These functions correspond to an example of a decision unit.

The function of the power level information acquisition unit 221 is shared in common with the function according to Exemplary Embodiment 1. The specific operation sensing unit 226 senses whether or not a series of operations related to initial setup operations have finished, whether or not a series of operations related to usage initialization operations have finished, or the like. If the specific operation is sensed, the specific operation sensing unit 226 outputs presence information as the sensing result.

The charge advisability decision unit 223C decides whether or not to allow charging of the secondary battery 202 with power received wirelessly, on the basis of the battery level and the specific operation presence information. In the present exemplary embodiment, the charge advisability decision unit 223C allows charging of the secondary battery 202 when the specific operation is not sensed, and the power level is low.

<Processing Sequence Executed by Electronic Apparatus>

Figure 17:
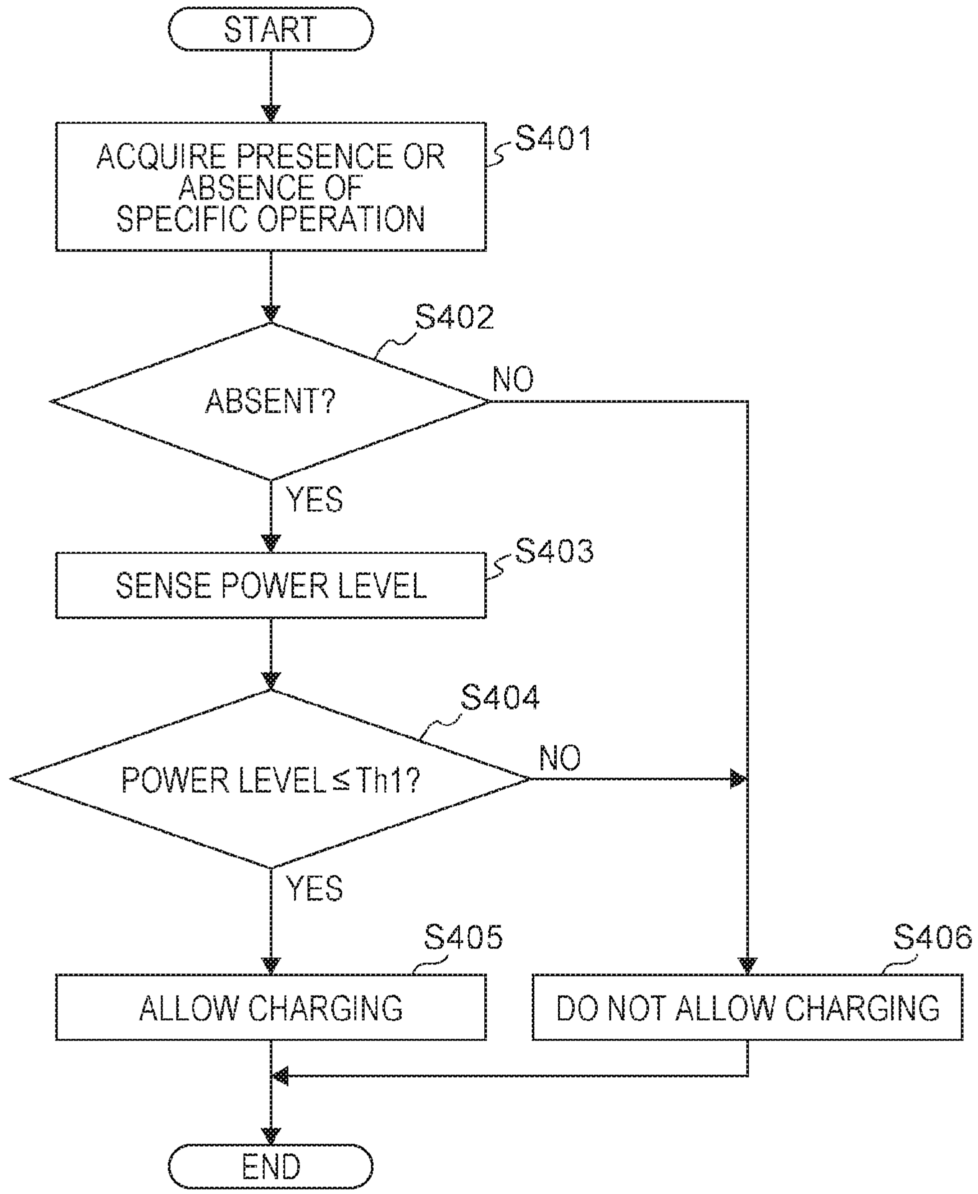
FIG. 17 is a flowchart illustrating an example of a processing sequence executed by a charge advisability decision unit according to Exemplary Embodiment 4.

Next, a sequence of wireless charging operations executed by the electronic apparatus 200C according to the present exemplary embodiment will be described. In the case of the present exemplary embodiment, the determination of whether or not to charge likewise is executed internally inside the electronic apparatus 200C. FIG. 17 is a flowchart illustrating an example of a processing sequence executed by the charge advisability decision unit 223C according to Exemplary Embodiment 4. The charge advisability decision unit 223C repeatedly executes the process of the flowchart illustrated in FIG. 17.

First, the charge advisability decision unit 223C acquires the specific operation sensing result (step 401). Next, the charge advisability decision unit 223C determines whether or not the specific operation is absent (step 402). If a positive result is obtained in step 402 (that is, if the specific operation is absent), the charge advisability decision unit 223C acquires the battery level from the power level information acquisition unit 221, and senses the power level of the secondary battery 202 (step 403). Next, the charge advisability decision unit 223C determines whether or not the power level is less than or equal to a predetermined threshold value Th1 (step 404).

If a positive result is obtained in step 404, the charge advisability decision unit 223C outputs a control signal allowing charging to the power source control unit 203 (step 405). In this case, if there is power transferred from the wireless power receiving unit 204, the wireless power receiving unit 204 uses this power to charge the secondary battery 202. Obviously, even if charging is allowed, the secondary battery 202 is not charged if the wireless power receiving unit 204 does not receive a supply of power wirelessly from the power supply device 300.

If a negative result is obtained in step 402 or step 404, the charge advisability decision unit 223C outputs a control signal not allowing charging to the power source control unit 203 (step 406). While this control signal is being output, the power source control unit 203 does not charge the secondary battery 202, even if wirelessly supplied power exists.

As above, in the present exemplary embodiment, whether or not to allow charging is decided by using information about whether or not a specific operation is performed on the electronic apparatus 200C instead of the state of packaging. According to the present exemplary embodiment, the wireless supply of power and the charging of the secondary battery 202 based on such power are realized even after the electronic apparatus 200C is taken out of the packaging material 400, until the handover of the electronic apparatus 200C to the user at the store is completed. Since the electronic apparatus 200C according to the present exemplary embodiment does not indiscriminately charge the secondary battery 202 whenever a supply of power is received wirelessly from the power supply device 300, the execution of unnecessary charging is avoided.

Exemplary Embodiment 5

In Exemplary Embodiments 1 to 4 discussed above, the electronic apparatus 200 (200A, 200B, 200C) itself decides whether or not to allow charging of the secondary battery 202 with power received wirelessly. However, the present exemplary embodiment describes a case in which the function of deciding whether or not to allow charging is provided on the side of the power supply device 300.

Figure 18:
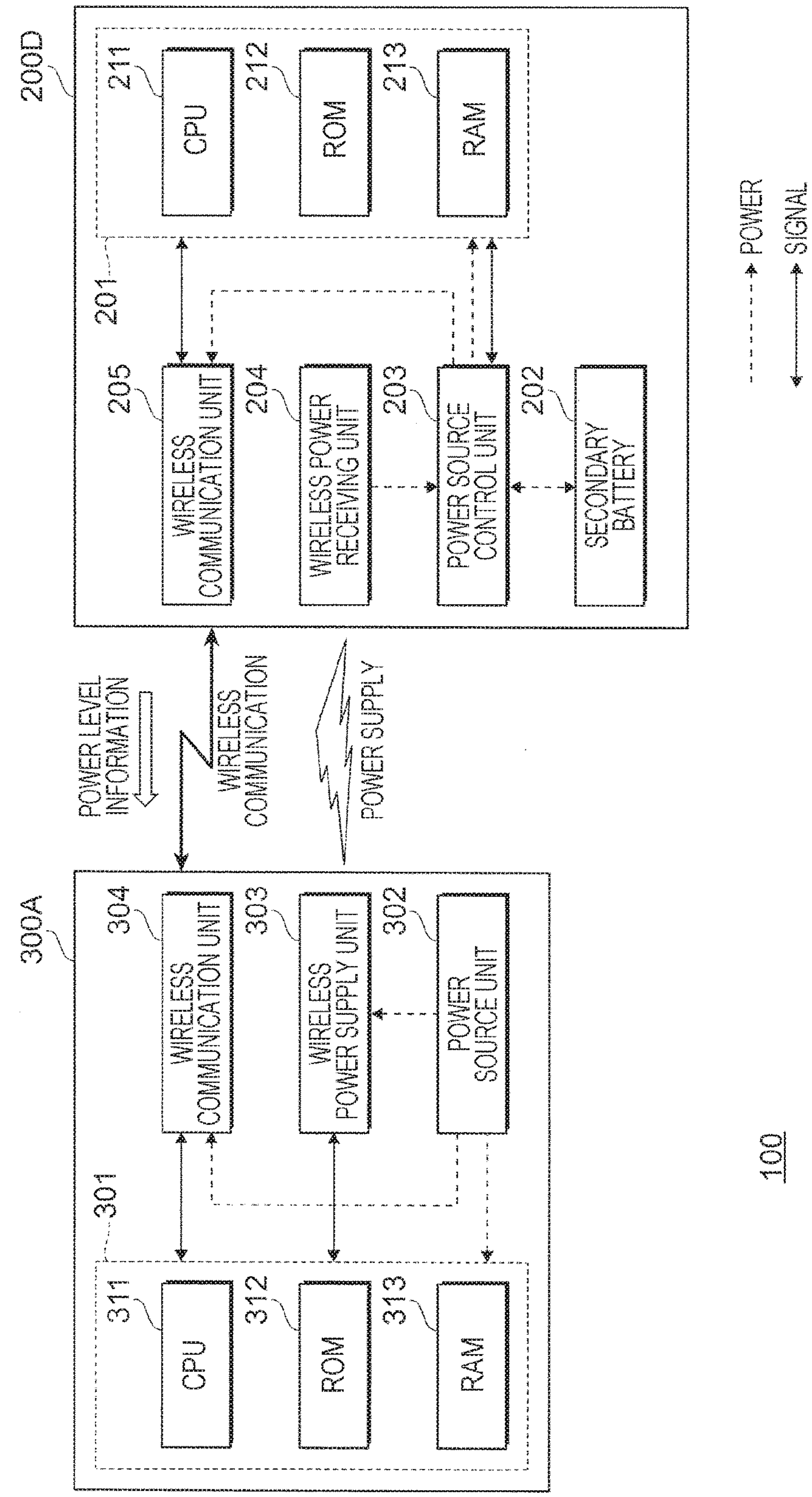
FIG. 18 is a diagram illustrating an exemplary conceptual configuration of a wireless power supply system used by Exemplary Embodiment 5.

FIG. 18 is a diagram illustrating an exemplary conceptual configuration of a wireless power supply system 100 used by Exemplary Embodiment 5. The wireless power supply system 100 is made up of an electronic apparatus 200D and a power supply device 300A. The wireless power supply system 100 according to the present exemplary embodiment similarly anticipates a usage scenario in which power is supplied from the power supply device 300A to the electronic apparatus 200D in the packed state, and the secondary battery 202 inside the electronic apparatus 200D is charged.

The points characteristic to the present exemplary embodiment are that the function of deciding whether or not to allow charging which is adopted in the foregoing exemplary embodiments is provided on the side of the power supply device 300A rather than the side of the electronic apparatus 200D, and that power level information about the secondary battery 202 is reported from the electronic apparatus 200D to the power supply device 300A. The power supply device 300A according to the present exemplary embodiment is used along the distribution route. For this reason, the electronic apparatus 200D is in the packed state. Also, since the electronic apparatus 200D according to the present exemplary embodiment is not provided with the function of deciding whether or not to allow charging, when the electronic apparatus 200D receives power supplied wirelessly, the electronic apparatus 200D starts charging with that power.

<Functional Configuration of Control Unit Constituting Power Supply Device>

Figure 19:
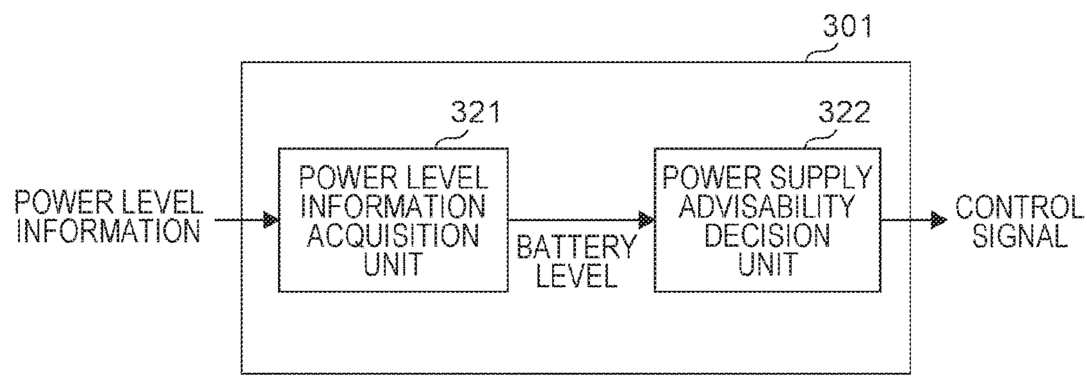
FIG. 19 is a block diagram illustrating an example of a functional configuration related to wireless charging from among various functions executed by a control unit of a power supply device according to Exemplary Embodiment 5.

Next, a functional configuration of the control unit 301 will be described. FIG. 19 is a block diagram illustrating an example of a functional configuration related to wireless charging from among various functions executed by the control unit 301 according to Exemplary Embodiment 5. The control unit 301 illustrated in FIG. 19 is made up of a power level information acquisition unit 321 that acquires power level information about the secondary battery 202 from the electronic apparatus 200D, and a power supply advisability decision unit 322 that decides whether or not to supply power to the electronic apparatus 200D. These functions correspond to an example of a decision unit.

The power level information acquisition unit 321 acquires power level information about the secondary battery 202 received from the electronic apparatus 200D via the wireless communication unit 304, and outputs the received power level information to the power supply advisability decision unit 322 as information expressing the battery level. At this point, the wireless communication unit 304 acquires the power level information by communicating with the wireless communication unit 205 provided in the electronic apparatus 200D. Attached to the power level information is information that identifies the electronic apparatus 200D. Note that a mechanism may be configured whereby the power level information about the secondary battery 202 is transmitted repeatedly from the electronic apparatus 200D side, or whereby the electronic apparatus 200D replies when the power supply device 300A requests the transmission of power level information.

The power supply advisability decision unit 322 decides whether or not charging of the secondary battery 202 is advisable on the basis of the battery level, and if charging is advisable, instructs the wireless power supply unit 303 which acts as a power supplier to supply power wirelessly. The instruction at this point is output from the power supply advisability decision unit 322 to the wireless power supply unit 303 as a control signal.

<Processing Sequence Executed by Power Supply Device>

Figure 20:
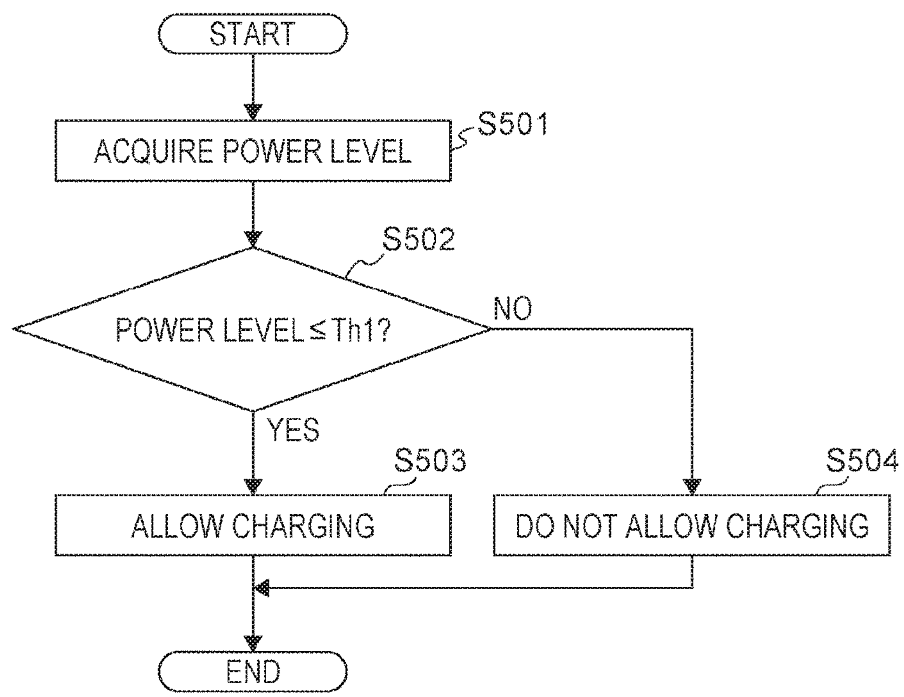
FIG. 20 is a flowchart illustrating an example of a processing sequence executed by a power supply advisability decision unit according to Exemplary Embodiment 5.

Next, a sequence of wireless charging operations executed by the power supply device 300A according to the present exemplary embodiment will be described. In the case of the present exemplary embodiment, the decision of whether or not to supply power wirelessly is executed on the side of the power supply device 300A. FIG. 20 is a flowchart illustrating an example of a processing sequence executed by the power supply advisability decision unit 322 according to Exemplary Embodiment 5. The power supply advisability decision unit 322 repeatedly executes the process of the flowchart illustrated in FIG. 20.

First, the power supply advisability decision unit 322 acquires the battery level (power level) from the power level information acquisition unit 321 (step 501). Next, the power supply advisability decision unit 322 determines whether or not the power level of the secondary battery 202 is less than or equal to a predetermined threshold value Th1 (step 502).

If a positive result is obtained in step 502, the power supply advisability decision unit 322 outputs a control signal allowing power supply to the wireless power supply unit 303 (step 503). In this case, the wireless power supply unit 303 follows the predetermined wireless power supply method, and starts supplying power wirelessly. Meanwhile, the electronic apparatus 200D (power source control unit 203) receiving the wireless supply of power charges the secondary battery 202 using this power.

If a negative result is obtained in step 502, the power supply advisability decision unit 322 outputs a control signal not allowing power supply to the wireless power supply unit 303 (step 504). While this control signal is being output, the wireless power supply unit 303 stops supplying power wirelessly. Note that if the wireless power supply area is broad, and power may be supplied to multiple electronic apparatuses 200D at once, power may be supplied from the wireless power supply unit 303 as long as power supply is allowed for at least one electronic apparatus 200D. Also, if the wireless power supply area is selectively switchable, power may be supplied selectively to an electronic apparatus 200D with a low power level.

As above, in the present exemplary embodiment, the wireless supply of power from the power supply device 300A is executed selectively according to the advisability of charging with respect to the electronic apparatus 200D in the packed state. For this reason, power is not supplied wirelessly to an electronic apparatus 200D that does not need charging, and the execution of unnecessary charging on the electronic apparatus 200D side is avoided.

Exemplary Embodiment 6

<Configuration of Wireless Power Supply System>

Exemplary Embodiment 5 describes a case in which the information about the power level of the secondary battery 202 provided in the electronic apparatus 200D is acquired directly by wireless communication. The present exemplary embodiment describes a case of using information about the power level of the secondary battery 202 provided in the electronic apparatus 200D which is estimated from a shipping date or a manufacturing date.

Figure 21:
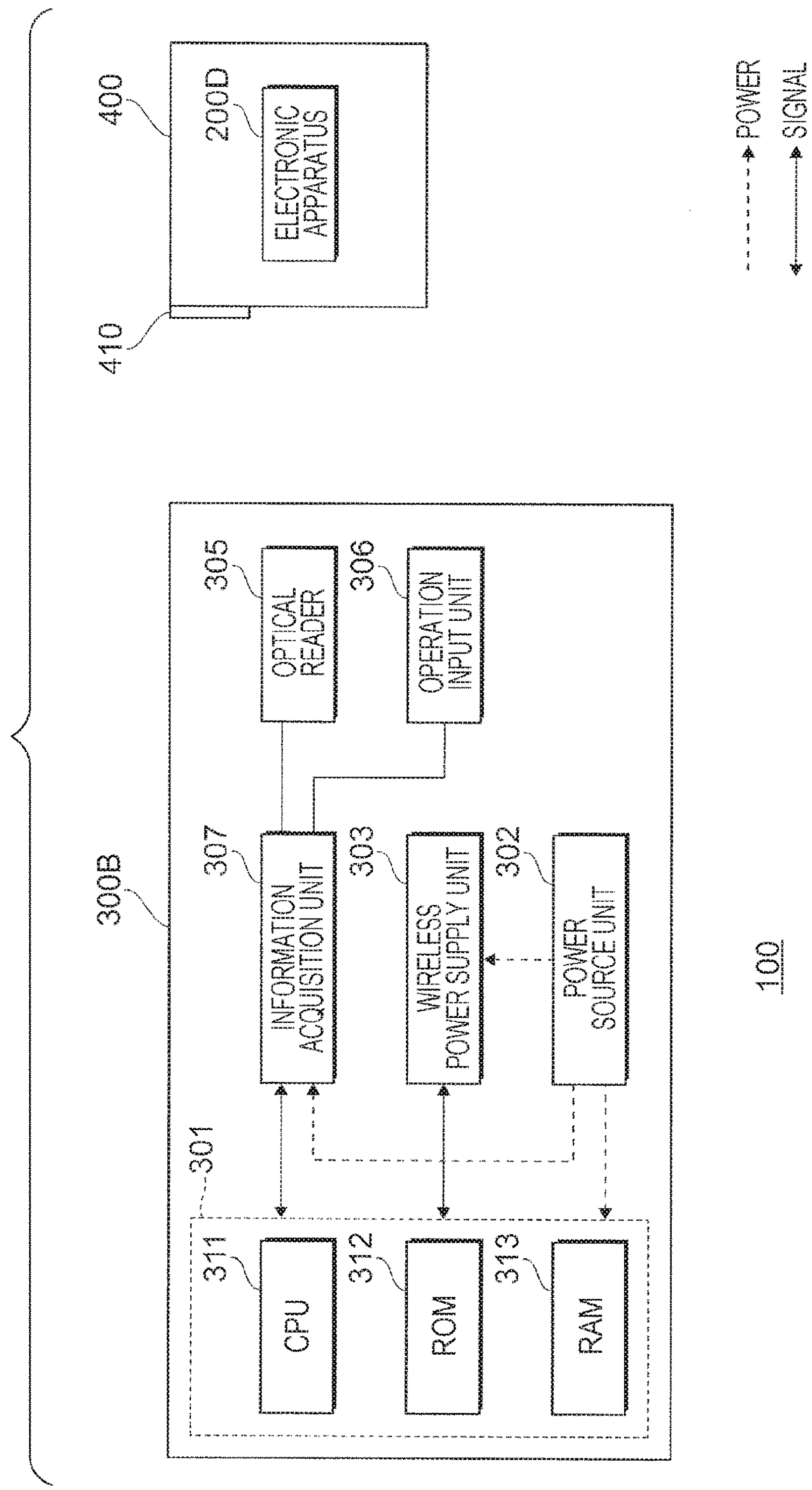
FIG. 21 is a diagram illustrating an exemplary conceptual configuration of a wireless power supply system 100 used by Exemplary Embodiment 6.

FIG. 21 is a diagram illustrating an exemplary conceptual configuration of a wireless power supply system 100 used by Exemplary Embodiment 6. Information 410 related to the shipping date or the manufacturing date is printed on the packaging material 400 of the electronic apparatus 200D. Note that the information 410 may also be printed on an adhesive label affixed to the packaging material 400. Furthermore, it is not necessary for both the shipping date and the manufacturing date to be printed. The shipping date or the manufacturing date may be printed as text or symbols, or may be printed as a barcode or QR code (registered trademark). Also, the shipping date and the manufacturing date may be estimated from a serial number printed on the packaging material 400.

The power supply device 300B according to the present exemplary embodiment is provided with an optical reader 305 that optically reads the shipping date or the manufacturing date, an operation input unit 306 (for example, a keyboard) by which a user manually inputs the information 410 read visually, and an information acquisition unit 307 that passes the acquired or input information to the control unit 301.

<Functional Configuration of Control Unit Constituting Power Supply Device>

Figure 22:
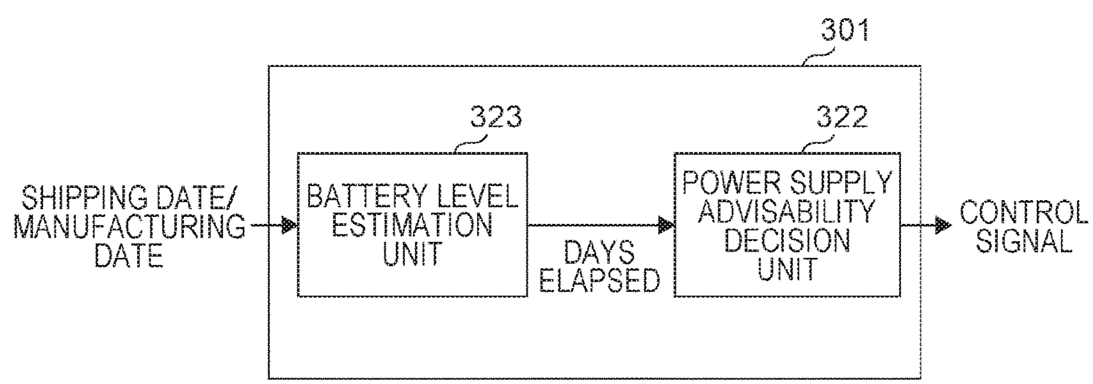
FIG. 22 is a block diagram illustrating an example of a functional configuration related to wireless charging from among various functions executed by a control unit of a power supply device according to Exemplary Embodiment 6.

Next, a functional configuration of the control unit 301 will be described. FIG. 22 is a block diagram illustrating an example of a functional configuration related to wireless charging from among various functions executed by the control unit 301 according to Exemplary Embodiment 6. The control unit 301 illustrated in FIG. 22 is made up of a battery level estimation unit 323 that estimates power level information about the secondary battery 202 from the shipping date or the manufacturing date, and a power supply advisability decision unit 322 that decides whether or not to supply power to the electronic apparatus 200D. These functions correspond to an example of a decision unit.

The battery level estimation unit 323 according to the present exemplary embodiment uses the number of days that have elapsed from the shipping date or the manufacturing date until the execution of the estimation process as estimated information about the battery level. However, the power level may also be calculated like in Exemplary Embodiments 1 to 4 discussed earlier, on the basis of the number of elapsed days.

The power supply advisability decision unit 322 decides whether or not charging of the secondary battery 202 is advisable on the basis of the number of elapsed days, and if wireless power supply is advisable, instructs the wireless power supply unit 303 which acts as a power supplier to supply power wirelessly. The instruction at this point is output from the power supply advisability decision unit 322 to the wireless power supply unit 303 as a control signal.

<Processing Sequence Executed by Power Supply Device>

Figure 23:
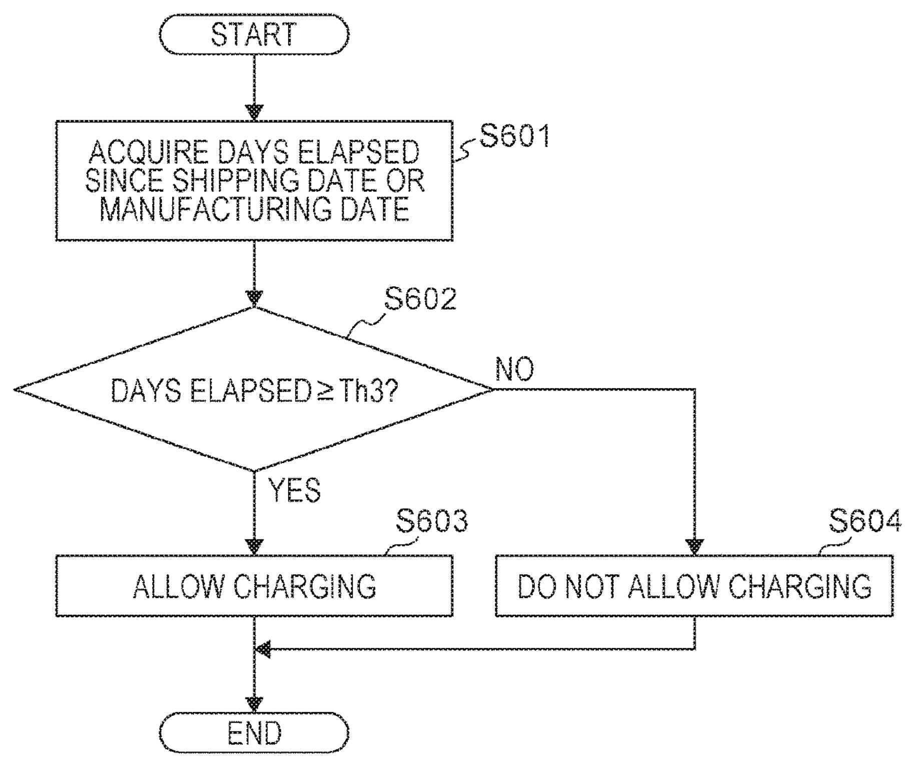
FIG. 23 is a flowchart illustrating an example of a processing sequence executed by a power supply advisability decision unit according to Exemplary Embodiment 6.

Next, a sequence of wireless charging operations executed by the power supply device 300B according to the present exemplary embodiment will be described. In the case of the present exemplary embodiment, the determination of whether or not to supply power wirelessly is executed on the side of the power supply device 300B. FIG. 23 is a flowchart illustrating an example of a processing sequence executed by the power supply advisability decision unit according to Exemplary Embodiment 6. The power supply advisability decision unit 322 repeatedly executes the process of the flowchart illustrated in FIG. 23.

First, the power supply advisability decision unit 322 acquires the number of days that have elapsed since the shipping date or the manufacturing date from the battery level estimation unit 323 (step 601). Next, the power supply advisability decision unit 322 determines whether or not the number of elapsed days is equal to or greater than a predetermined threshold value Th3 (step 602).

If a positive result is obtained in step 602, the power supply advisability decision unit 322 outputs a control signal allowing power supply to the wireless power supply unit 303 (step 603). This is because a positive result being obtained in step 602 means that many days have elapsed since the shipping date or the manufacturing date, and there is a high probability that the power level of the secondary battery 202 has dropped. In this case, the wireless power supply unit 303 follows the predetermined wireless power supply method, and starts supplying power wirelessly. The electronic apparatus 200D (power source control unit 203) receiving the wireless supply of power charges the secondary battery 202 using this power.

If a negative result is obtained in step 602, the power supply advisability decision unit 322 outputs a control signal not allowing power supply to the wireless power supply unit 303 (step 604). This is because a negative result being obtained in step 602 means that not many days have elapsed since the shipping date or the manufacturing date, and there is a high probability that the power level of the secondary battery 202 has not dropped. While this control signal is being output, the wireless power supply unit 303 does not start supplying power wirelessly.

As above, in the present exemplary embodiment, the wireless supply of power from the power supply device 300B is executed selectively according to the advisability of charging with respect to the electronic apparatus 200D in the packed state. For this reason, power is not supplied wirelessly to an electronic apparatus 200D that does not need charging, and the execution of unnecessary charging on the electronic apparatus 200D side is avoided.

Other Exemplary Embodiments

Figure 24:
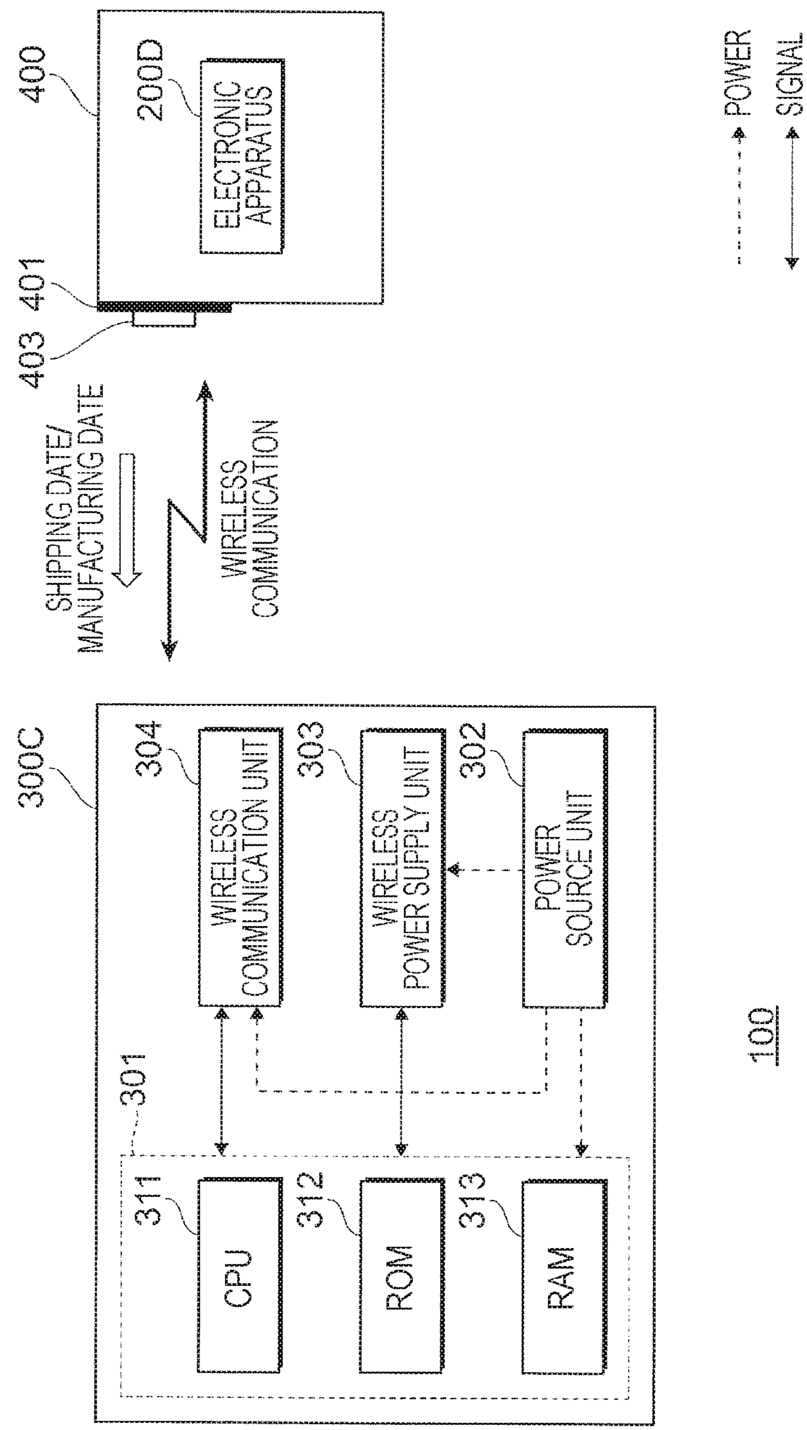
FIG. 24 is a diagram illustrating an exemplary conceptual diagram of a wireless power supply system that reads out and uses information about a shipping date or a manufacturing date from an IC tag of an electronic tag affixed to the surface of a packaging material.

Exemplary Embodiment 6 above describes a case in which information about the shipping date or the manufacturing date is given to the power supply device 300B using an optical reader 305 or an operation input unit 306. However, information about the shipping date or the manufacturing date may also be read out from an electronic tag. FIG. 24 is a diagram illustrating an exemplary conceptual diagram of a wireless power supply system that reads out and uses information about a shipping date or a manufacturing date from the IC chip 403 of the electronic tag 401 affixed to the surface of the packaging material 400. In the case of FIG. 24, a device conforming to the communication standard of the electronic tag 401 is used as the wireless communication unit 304.

In Exemplary Embodiment 6 discussed above, whether or not to allow charging is determined on the basis of a number of elapsed days calculated on the basis of information about the shipping date or the manufacturing date, but if charging has already been executed before the determination is made, an error may occur in the determination of whether or not to allow charging. Accordingly, if a charging date is recorded in the electronic tag or the like of the packaging material 400, whether or not to allow charging may be decided by calculating the number of elapsed days since the last charging date.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
- a secondary battery;
- a power receiver configured to receive power wirelessly from a power supply device;
- a decision unit configured to decide whether or not to allow charging with the power received wirelessly; and
- a charging unit configured to charge the secondary battery with the received power if the decision unit decides that charging with the power received wirelessly is allowed,
- wherein the decision unit is configured to decide to allow charging with the power received wirelessly if information is sensed indicating that the electronic apparatus is enclosed in a package.

2. The electronic apparatus according to claim 1, wherein the decision unit is configured to decide additionally decides, to allow charging with the power received wirelessly if a power level of the secondary battery is less than a threshold value.

3. The electronic apparatus according to claim 1, further comprising:
- a sensing unit configured to sense illumination,
- wherein the decision unit is configured to decide to allow charging with the power received wirelessly if a sensed value of illumination is lower than a predetermined value.

4. The electronic apparatus according to claim 1, further comprising:
- a sensing unit configured to sense a severing of a conductive member attached to the package,
- wherein the decision unit is configured to decide to allow charging with the power received wirelessly if the severing of the conductive member is not sensed.

5. The electronic apparatus according to claim 4, further comprising:
- a wireless communication unit configured to communicate with an electronic tag configured to use the conductive member as an antenna,
- wherein the sensing unit is configured to sense the severing of the conductive member according to whether or not communication by the wireless communication unit with the electronic tag is available.

6. The electronic apparatus according to claim 1, wherein the decision unit is configured to decide to allow charging with the power received wirelessly only during a period until a predetermined operation is sensed.

7. The electronic apparatus according to claim 6, wherein the decision unit is configured to decide to allow charging with the power received wirelessly only during a period until an initial setup operation is sensed.

8. The electronic apparatus according to claim 6, wherein the sensing unit is configured to decide to allow charging with the power received wirelessly only during a period until an operation initializing usage of the electronic apparatus is sensed.

9. The electronic apparatus according to claim 1, wherein the decision unit is configured to decide to allow charging with the power received wirelessly in response to determining that the electronic apparatus is enclosed in the package.

10. A power supply device comprising:
- a power supplier configured to supply power wirelessly; and
- a controller configured to decide whether or not charging of a secondary battery in an electronic apparatus enclosed in a package is allowed using information related to a power level of the secondary battery,
- wherein the controller is configured to, if the controller decides that charging of the secondary battery is allowed, instruct the power supplier to supply power wirelessly to the secondary battery, wherein the controller is configured to acquire the power level of the secondary battery through wireless communication with the electronic apparatus, and wherein the controller is configured to decide that charging of the secondary battery is allowed using the acquired power level of the secondary battery.

11. The power supply device according to claim 10, wherein the controller is configured to decide that wireless power supply is allowed if the power level of the secondary battery is low.

12. The power supply device according to claim 10, wherein the controller is configured to decide whether or not to allow charging using at least one of information about a serial number, a manufacturing date, or a shipping date acquired from an outer surface of the package.

13. The power supply device according to claim 12, wherein the controller is configured to optically acquire information about the manufacturing date or the shipping date affixed to or printed on the outer surface.

14. The power supply device according to claim 12, wherein the controller is configured to acquire information about the manufacturing date or the shipping date through wireless communication with an electronic tag affixed to the outer surface.

15. The power supply device according to claim 12, wherein the controller is configured to estimate information about the manufacturing date or the shipping date using the serial number.

16. The power supply device according to claim 10, wherein the controller is configured to determined whether or not to allow charging using information about a last charging date acquired from an outer surface of the package.

17. The power supply device according to claim 10, wherein the controller is configured to decide whether or not the electronic apparatus is enclosed in the package, and wherein the controller is configured to decide that the charging of the secondary battery is allowed in response to deciding that the electronic apparatus is enclosed in the package.

18. A wireless power supply system comprising:

an electronic apparatus enclosed in a package, the electronic apparatus including:

a secondary battery;

a power receiver configured to receive power wirelessly from a power supply device; and a charging unit configured to charge the secondary battery with the received power; and a power supply device including:

a power supplier configured to supply power wirelessly; and a controller configured to decide whether or not charging of the secondary battery allowed using information related to a power level of the secondary battery, wherein the controller is configured to, if the controller decides that wireless power supply is allowed, instruct the power supplier to supply power wirelessly to the secondary battery, wherein the controller is configured to acquire the power level of the secondary battery through wireless communication with the electronic apparatus, and wherein the controller is configured to decide that charging of the secondary battery is allowed using the acquired power level of the secondary battery.

19. The wireless power supply system according to claim 18, wherein the controller is configured to decide whether or not the electronic apparatus is enclosed in the package, and wherein the controller is configured to decide that the charging of the secondary battery is allowed in response to deciding that the electronic apparatus is enclosed in the package.

* * * * *